(12) United States Patent
Ryan

(10) Patent No.: US 12,555,100 B2
(45) Date of Patent: Feb. 17, 2026

(54) METHOD, APPARATUS, AND COMPUTER-READABLE MEDIUM FOR GENERATING A PROXY TOKEN

(71) Applicant: Blackbeard Development Group, LLC, Camden, DE (US)

(72) Inventor: Richard Ryan, Jasper, TN (US)

(73) Assignee: BLACKBEARD DEVELOPMENT GROUP, LLC, Camden, DE (US)

( * ) Notice: Subject to any disclaimer, the term of this patent is extended or adjusted under 35 U.S.C. 154(b) by 10 days.

(21) Appl. No.: 18/444,025

(22) Filed: Feb. 16, 2024

(65) Prior Publication Data

US 2024/0281799 A1    Aug. 22, 2024

Related U.S. Application Data

(60) Provisional application No. 63/464,858, filed on May 8, 2023, provisional application No. 63/464,860, filed on May 8, 2023, provisional application No. 63/446,092, filed on Feb. 16, 2023.

(51) Int. Cl.
G06Q 20/00      (2012.01)
G06Q 20/36      (2012.01)
(52) U.S. Cl.
CPC ............... G06Q 20/3678 (2013.01)
(58) Field of Classification Search
None
See application file for complete search history.

(56) References Cited

U.S. PATENT DOCUMENTS 10,225,325 B2 *  3/2019  Schincariol ......... H04L 41/0806
2003/0163787 A1 *  8/2003  Hay ....................... G06Q 30/06
                                                            715/248
2008/0263645 A1 * 10/2008  Renter ................ H04L 63/0428
                                                            705/66

(Continued)

OTHER PUBLICATIONS

Ayhan; Federated_multi-agency_credentialing; IEEE; 8 pages; 2015.*

(Continued)

*Primary Examiner* — Radu Andrei
(74) *Attorney, Agent, or Firm* — Reed Smith LLP; Amardeep S. Grewal

(57) ABSTRACT

A method, apparatus, and computer-readable medium for generating a proxy token, including receiving a proxy token initiation message from an entity on the computer network, the proxy token initiation message referencing an existing token stored on a distributed storage system, determining whether the entity controls a private key required to transfer the existing token to a different location on the distributed storage system, generating a platform signature based at least in part on a determination that the entity controls a private key required to transfer the existing token to a different location on the distributed storage system, and transmitting a proxy token generation message, the proxy token generation message comprising the platform signature, the proxy token being generated based at least in part on the transmission of the proxy token generation message and the platform signature, and the proxy token being linked in a memory to the existing token.

24 Claims, 19 Drawing Sheets

(56) References Cited

U.S. PATENT DOCUMENTS

| | | | | |
|---|---|---|---|---|
| 2014/0337955 | A1* | 11/2014 | Mendelovich | H04L 63/08 |
| | | | | 726/9 |
| 2015/0286834 | A1* | 10/2015 | Ohtani | H04L 67/02 |
| | | | | 726/28 |
| 2019/0124112 | A1* | 4/2019 | Thomas | G06F 21/40 |
| 2019/0251199 | A1* | 8/2019 | Klianev | G06Q 40/04 |
| 2022/0309491 | A1 | 9/2022 | Shapiro et al. | |
| 2022/0327529 | A1* | 10/2022 | Williams | H04L 9/50 |
| 2023/0254149 | A1* | 8/2023 | Iyengar | H04L 9/3239 |
| | | | | 726/9 |
| 2024/0146552 | A1* | 5/2024 | Marsh | H04L 9/50 |
| 2024/0146674 | A1* | 5/2024 | Lang | H04L 51/07 |

OTHER PUBLICATIONS

Haron; Extending_security_token_to_directly_issue_proxy_certificate_on_P-GRADE_portal; IEEE; pp. 979-985; 2009.*
Huang; A_Token-Based_User_Authentication_Mechanism_for_Data_Exchange_in_RESTful_API; ICNBIS; pp. 601-606; 2015.*
Silva Martins; Performance_evaluation_for_signing_JSON_tokens_in_access_control_for_the_cloud_of_things; IEEE; 7 pages; 2020.*
International Search Report and Written Opinion cited in PCT/US24/16246 dated Jun. 3, 2024, 8 Pages.

* cited by examiner

METHOD, APPARATUS, AND COMPUTER-READABLE MEDIUM FOR GENERATING A PROXY TOKEN

CROSS REFERENCE TO RELATED APPLICATIONS

This application claims priority to U.S. Provisional Application No. 63/446,092, titled "PROXY TOKENS," filed Feb. 16, 2023, U.S. Provisional Application No. 63/464,858, titled "BLOCKCHAIN BASED NON-FUNGIBLE TOKEN PROXY TRANSACTIONS," filed May 8, 2023, and U.S. Provisional Application No. 63/464,860, titled "PROXY TOKENS WITH TRUSTED AND TRUSTLESS VALIDATION," filed May 8, 2023, the disclosures of which are hereby incorporated by reference in their entirety.

BACKGROUND

A Non-Fungible Token or NFT is a unique and indivisible digital asset stored on a blockchain. Typically, NFTs are used to represent ownership of a piece of digital content such as, for example, art, collectibles, or other virtual items. An NFT generally comprises a unique set of data recorded digitally in a blockchain that comprises a permanent record of its provenance, sales history and ownership from the time of creation by the content creator through each successive owner. In some instances, ownership of an NFT can confer tangible real world benefits to the owner. For example, ownership of an NFT can confer on the owner the benefit of access to an exclusive club or venue, access to content, digitals rights, or other privileges. However, access to any benefits, rights, or privileges associated with the NFT requires physical control of the NFT. Accordingly, improvements are needed in systems for token-based systems for granting privileges and benefits.

SUMMARY

An apparatus, method, and computer readable medium (collectively, the "system") of a proxy token platform ("platform") on a computer network is disclosed for generating a proxy token. The system can be configured to receive a proxy token initiation message from an entity on the computer network, the proxy token initiation message referencing an existing token stored on a distributed storage system, determine whether the entity controls a private key required to transfer the existing token to a different location on the distributed storage system, generate a platform signature based at least in part on a determination that the entity controls a private key required to transfer the existing token to a different location on the distributed storage system, and transmit a proxy token generation message, the proxy token generation message comprising the platform signature, the proxy token being generated based at least in part on the transmission of the proxy token generation message and the platform signature, and the proxy token being linked in a memory to the existing token.

The platform can be configured to verify validity of the proxy token based at least in part on one or more of: ownership of the existing token or a current linkage of the proxy token to the existing token.

The existing token can be stored on a first blockchain and the proxy token can be stored on a second blockchain distinct from the first blockchain. Alternatively, the existing token and proxy token can be on the same blockchain.

The proxy token can be linked to the existing token in metadata associated with the proxy token on a blockchain. The proxy token can alternatively or additionally be linked to the existing token in a database external to a blockchain storing the proxy token. The platform signature can also be stored in the database external to the blockchain storing the proxy token.

The system can further be configured to receive a request to verify validity of the proxy token, determine whether the entity is currently the owner of the existing token, determine whether the proxy token is currently linked to the existing token, and transmit a verification message verifying validity of the proxy token based at least in part on a determination that the entity is currently the owner of the existing token and a determination that the proxy token is currently linked to the existing token.

The system can further be configured to monitor ownership of the existing token on a periodic basis, detect a change in ownership of the existing token, and cause the proxy token to be invalidated in response to detecting a change in ownership of the existing token. Causing the proxy token to be invalidated can include one or more of unlinking the proxy token from the existing token or transmitting a burn instruction causing the proxy token to be burned.

Determining whether the entity controls a private key required to transfer the existing token to a different location on the distributed storage system can include receiving a storage wallet address corresponding to a storage wallet that is distinct from an asset wallet storing the existing token, detecting transfer of the existing token from the asset wallet to the storage wallet based at least in part on the storage wallet address, and determining that the entity controls the private key required to transfer the existing token to a different location on the distributed storage system based at least in part on detecting transfer of the existing token from an asset wallet to the storage wallet address. The storage wallet can be a cold wallet.

Determining whether the entity controls a private key required to transfer the existing token to a different location on the distributed storage system can include transmitting the proxy token initiation message to the entity for signature using a private key associated with an asset wallet storing the existing token, receiving the signed the proxy token initiation message, determining whether the signed proxy token initiation message is signed using the private key associated with the asset wallet storing the existing token, and determining that the entity controls the private key required to transfer the existing token to a different location on the distributed storage system based at least in part on a determination that the signed proxy token initiation message is signed using the private key associated with the asset wallet storing the existing token.

The proxy token in the system can be generated by generating a minting transaction for the proxy token, signing the minting transaction using a private key of an initializer wallet associated with the entity, and executing the minting transaction to generate the proxy token. The minting transaction can take as input the platform signature and one or more of: an identifier of the existing token, an asset wallet address of an asset wallet, a storage wallet address corresponding to a storage wallet, or an initializer wallet address of the initializer wallet. The initializer wallet can be an asset wallet of the entity.

The system can receive first NFT at a first blockchain transaction address, create a second NFT comprising a proxy of the first NFT and providing the second NFT to a second blockchain transaction address, wherein at least a portion of attributes, privileges, or value associated with the first NFT is linked to the second NFT by a smart contract deployed on a blockchain network which is in electronic communication with each of the first blockchain transaction address and the second blockchain transaction address. The system can terminate the linkage between the first NFT and the second NFT in response to at least one of (i) transferring the first NFT from the first blockchain transaction address, (ii) transferring the second NFT from the first blockchain transaction address, or (iii) an elapsed period of time.

The system can include a processor a tangible, non-transitory electronic memory in electronic communication with the processor, and a set of computer readable code on the non-transitory electronic memory, including a time-based job scheduler, a token metadata reader, a proxy token metadata generator and a smart contract deployed on a blockchain network wherein in response to receiving a first blockchain transaction address associated with an NFT present at the first blockchain transaction address, the token metadata reader imports the metadata associated with the NFT, wherein in response to receiving the first blockchain transaction address and a second blockchain transaction address, the smart contract confirms the presence of the NFT at the first blockchain transaction address and monitors the second blockchain address for an incoming transaction, wherein in response to detecting an incoming transaction to the second blockchain transaction address, the smart contract checks the second blockchain transaction address to confirm the presence of the NFT at the second blockchain transaction address, and wherein in response to confirming the presence of the NFT at the second blockchain transaction address, the smart contract generates a proxy token associated with the NFT.

The proxy token can be transactable on the blockchain network. The proxy token can be stored at a third blockchain transaction address associated with the smart contract. In response to generating the proxy token associated with the NFT, the smart contract can transmit a mint proxy token event message to the proxy token metadata generator.

In response to receiving the mint proxy token event message, the proxy token metadata generator can read the imported metadata associated with the NFT and can generate proxy token metadata based on the metadata associated with the NFT, wherein the smart contract receives the proxy token metadata and stores the proxy token metadata to the blockchain network in association with the proxy token at the third transaction address. The smart contract can continuously monitors the second blockchain transaction address for transactions and, in response to detecting a transaction transferring the NFT from the second blockchain transaction address, can clear from the smart contract the metadata associated with the proxy token.

In response to receiving the mint proxy token event message, the time-based job scheduler can execute a task to clear from the smart contract the metadata associated with the proxy token after an elapsed period of time. The proxy token metadata generator can process each of the "name", "description", "external_url", and "image" metadata elements of the imported metadata associated with the NFT to generate the proxy token metadata.

The system can include a database module, wherein a database entry associated with the proxy token is generated in the database module in response to the mint proxy token event message, wherein the database entry comprises the proxy token metadata and is associated with a proxy token validity flag. The time-based job scheduler can execute a task to periodically check the proxy token validity flag to determine whether the flag is set to invalid, and in response to determining that the flag is set to invalid, can execute a task to purge the database entry associated with the proxy token from the database module and remove the proxy token from the smart contract.

The forgoing features and elements can be combined in various combinations without exclusivity, unless expressly indicated herein otherwise. These features and elements as well as the operation of system and platform will become more apparent in light of the following description and accompanying drawings.

BRIEF DESCRIPTION OF THE FIGURES

The subject matter of the present disclosure is particularly pointed out and distinctly claimed in the concluding portion of the specification. However, a more complete understanding of the present disclosure can be obtained by referring to the detailed description and claims when considered in connection with the drawing figures.

DETAILED DESCRIPTION

Figure 1:
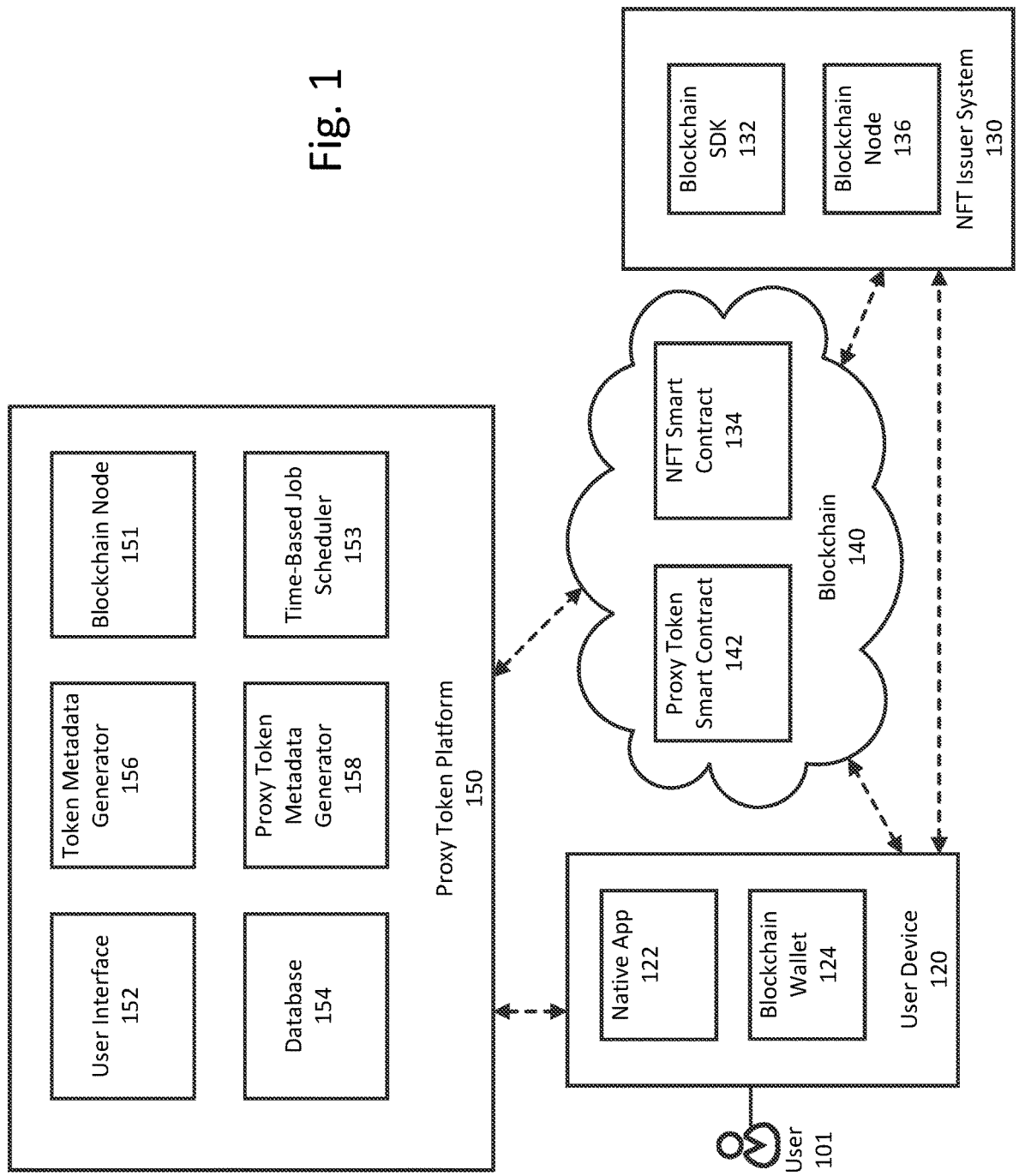
FIG. 1 illustrates a blockchain based non-fungible token proxy transaction system according to an exemplary embodiment.

The detailed description makes reference to the accompanying drawings and pictures, which show various aspects by way of illustration. While these various aspects are described in sufficient detail to enable those skilled in the art to practice the disclosure, it should be understood that other variations can be realized, and that logical and mechanical changes can be made without departing from the spirit and scope of the disclosure. Thus, the detailed description herein is presented for purposes of illustration only and not of limitation. For example, the steps recited in any of the method or process descriptions can be executed in any order and are not limited to the order presented. Moreover, any of the functions or steps can be outsourced to or performed by one or more third parties.

Existing systems and methods for transferring of NFTs include the technical problem of being unable to decouple the tangible benefits of NFT ownership from physical control over the NFT. A user evidences ownership an NFT by storing the NFT in a 'wallet' which is a digital or physical device capable of storing cryptocurrencies or other digital assets. The wallet generally enables the user to send, receive, and track the various digital assets which are stored in or transferred through the wallet. A typical wallet is associated with a plurality of blockchain transaction addresses and the user thereby able to own and controls the assets (such as NFTs) which are stored at the transaction addresses associated with the wallet.

For example, consider a use case in which Alice holds an NFT in her wallet. Alice's NFT allows the holder to access a private clubhouse. In order to gain entry, Alice presents her wallet which contains the NFT to the doorman and the doorman verifies that the NFT is present in her wallet. In a traditional system, if Alice wants to allow Bob to access the clubhouse temporarily (say, while Alice is away on business), Bob needs to demonstrate to the doorman that the NFT is present in Bob's wallet. Therefore, Alice transfers the NFT from her wallet to Bob's wallet but, in the case of blockchain networks, this transfer has the inherent effect of giving Bob control over the NFT. Alice must trust Bob to transfer the NFT back to her from his wallet. Traditional systems do not permit trustless transactions of this type because once the NFT is transferred from Alice to Bob, Bob can keep the NFT in his wallet indefinitely or transfer the NFT to any other wallet of his choosing.

In contrast to traditional blockchain based NFT transaction systems, the systems and methods disclosed herein enable generation of a transferable proxy token based on Alice's ownership of the NFT. The system includes a transaction platform and a smart contract deployed on the blockchain. Alice provides to the system a wallet address which contains her NFT (e.g, a first blockchain transaction address or, stated another way, her 'asset wallet ID') to the platform which confirms the presence of the NFT. Alice then provides a second address which is also associated with her wallet (i.e., a second blockchain transaction address, or, stated another way, her 'storage wallet ID'). The system prompts Alice to move her NFT from the asset wallet to the storage wallet. A smart contract verifies Alice's transaction from the asset wallet to the storage wallet, thus validating Alice has ownership and control of the NFT. The smart contract then generates a proxy token which is associated by the smart contract with Alice's NFT (a process generally known as 'minting'). The proxy token can contain data including references to an underlying asset (e.g., NFT), a smart contract, identifier information, an image, and/or metadata. On minting, the proxy token can be assigned to Alice's asset wallet (typically, as in the case of a hierarchical-deterministic wallet, assigned to a third blockchain transaction address which is associated with Alice's wallet). Alice can then transfer the proxy token to Bob. Bob can present the proxy token to the doorman to gain access to the clubhouse. The doorman recognizes the proxy token as created from Alice's NFT and permits entry. The proxy token can be presented to a computer. The computer recognizes the proxy token as created from Alice's NFT and sends a signal to an electronic door controller to open a door to grant Bob access to the clubhouse. The smart contract tracks the proxy token and the NFT. If the NFT is moved from the storage wallet, the smart contract invalidates the proxy token. In like regard, the smart contract can be configured to invalidate the proxy token if Bob transfers the proxy token to another wallet address. The system can have time based criteria to invalidate the proxy token. For example, the system can invalidate the proxy token after a user configurable amount of time has elapsed since minting the proxy token (e.g., a period of hours or days). In this regard, the systems and methods disclosed herein enable trustless transfers of NFT associated benefits, without the need to transfer permanent ownership or control of the NFT.

The paragraph above mentions that the system prompts Alice to move her NFT from the asset wallet to the storage wallet. A NFT can be moved to a different wallet in a variety of different ways. For instance, a user can use a specially-designed wallet, such as a a MagicLink wallet. The user can associate an email address with a wallet accessible by logging into an email account and an intermediate third-party service provider can facilitate the moving of the NFT. In further instances, a user can connect a wallet to a blockchain that the asset is on, then move the asset, issuing a transaction to an address specified by the user. In various instances, a user can directly interact with a smart contract to transfer the NFT. Different blockchains can have different mechanisms for asset transfers between or among wallets. An artisan will recognize that different blockchains provide for different asset transfer mechanisms, one or more of which can be implemented as appropriate. In an example instance, a user has custody of a wallet (e.g., Wallet A) and will move the asset to a different wallet (e.g., Wallet B) and declare that the move has occurred. The user can fund a smart contract which mints the proxy token in the event of the movement of the NFT from Wallet A to Wallet B. The user's intent to move the asset can be stored on the smart contract prior to the minting of the proxy token. For instance, the smart contract can reflect data to identify the NFT, data to identify a source wallet (e.g., Wallet A), and data to identify a destination wallet (e.g., Wallet B).

In the preceding discussion, reference is also made to a smart contract verifying Alice's transaction from the asset wallet to the storage wallet. In various instances, the smart contact can verify this through a variety of mechanisms. For example, a centralized entity holds contracts. In some instances, contracts on one blockchain do not interact with contracts on other blockchains. An administrative identity within the centralized entity access a ledger and alerts the smart contract that the NFT has moved between wallets. In various blockchains, a block time is associated with the creation of each new block. Upon creating of a new block, an application associated with the centralized entity checks for new transactions pertaining to the relevant NFT(s). Thus, the verifying can happen periodically coincident with, or with a delay generally following the periodicity of the block time.

In the preceding discussion, reference is made to the proxy token being assigned to an asset wallet. Various mechanisms for such assignment are possible. For instance, assignment of a proxy token to an asset wallet can be recorded on the smart contract directly on the blockchain. Also, the assignment can be stored in a traditional database. In various instances, the assignment can be both recorded on the blockchain and stored in a traditional database. This can facilitate faster access. Also, with the underlying asset (NFT) and the proxy token on different blockchains, the assignment can be recorded on both the blockchain and stored in a traditional database. Finally, with the underlying asset (NFT) and the proxy token on different blockchains, the assignment can be recorded on the blockchain and an oracle on the smart contract can be implemented.

In the preceding discussion, reference is made to presentation of the proxy token to a person or to a machine. For instance, a QR code can be generated associated with the proxy token and can be scanned by an electronic scanner. In further instances, authentication can be via a wireless connection such as Bluetooth. Moreover, coupons can be generated, loyalty rewards programs associated with a consumer can be tracked, and/or the like.

In the preceding discussion, reference is made to invalidating the proxy token and various mechanisms therefor. Validation and/or invalidation can occur at a smart contract level and/or at an API level. For instance, validation and/or invalidation (e.g., authentication) can be evaluated by directly accessing a smart contract. In further instance, a query can be made to an API on a traditional database to check validity. Tokens can be invalidated on the traditional database, and a backend system can create a transaction on a blockchain to reflect this invalidation. Thus, checking the validity/invalidity of the proxy token, as well as invalidating the token can occur on both a database and/or on a blockchain.

A blockchain network can host and/or implement one or more smart contracts. The smart contracts can control the end-to-end data flow in system and can autonomously govern the maintenance process by supporting execution and recording of various transaction data, as discussed further herein. For example, blockchain network can host one or more maintenance smart contracts. Maintenance smart contract can comprise executables that write data to maintained accounts blockchain in a predetermined format based on predetermined function parameters passed by an API call or the like, as discussed further herein. Maintenance smart contract can include a program written in a programming language such as, for example, Solidity, or any other suitable smart contract programming language.

The systems, methods, and computer readable mediums (collectively, the "system") described herein can use a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger can use features and functionality of blockchain technology, including, for example, consensus based validation, immutability, and cryptographically chained blocks of data. The blockchain can comprise a ledger of interconnected blocks containing data. The blockchain can provide enhanced security because each block can hold individual transactions and the results of any blockchain executables. Each block can link to the previous block and can include a timestamp. Blocks can be linked because each block can include the hash of the prior block in the blockchain. The linked blocks form a chain, with only one successor block allowed to link to one other predecessor block for a single chain. Forks can be possible where divergent chains are established from a previously uniform blockchain, though typically only one of the divergent chains will be maintained as the consensus chain. The blockchain can implement smart contracts that enforce data workflows in a decentralized manner. The system can also include applications deployed on user devices such as, for example, computers, tablets, smartphones, Internet of Things devices ("IoT" devices), etc. The applications can communicate with the blockchain (e.g., directly or via a blockchain node) to transmit and retrieve data. A governing organization or consortium can control access to data stored on the blockchain. Registration with the managing organization(s) can enable participation in the blockchain network.

Data transfers (e.g., transfers of non-fungible tokens, etc.) performed through the system can propagate to the connected peers within the blockchain network within a duration that can be determined by the block creation time of the specific blockchain technology implemented. For example, on an ETHEREUM®-based network, a new data entry can become available within about 13-20 seconds as of the writing. On a Hyperledger® Fabric 1.0 based platform, the duration is driven by the specific consensus algorithm that is chosen and can be performed within seconds. In that respect, propagation times and the speed of transferring data, initiating purchases, and completing purchases in the system can be improved compared to existing systems, and implementation costs and time to market can also be drastically reduced. The system also offers increased security at least partially due to the immutable nature of data that is stored in the blockchain, reducing the probability of tampering with various data inputs and outputs. Moreover, the system can also offer increased security of buying requests and purchases by performing cryptographic processes on data prior to storing the data on the blockchain. Therefore, by transmitting, storing, and accessing data using the system described herein, the security of the data is improved, which decreases the risk of the computer or network from being compromised.

The system can also reduce database synchronization errors by providing a common data structure, thus at least partially improving the integrity of stored data. Further, by syncing data with the involved parties in real time (or near real time), the system can improve data integrity, data confidentiality, and data security, which can also improve the speed of validating NFT ownership and control and confirming NFT proxy token transfers. The system also offers increased reliability and fault tolerance over traditional databases (e.g., relational databases, distributed databases, etc.) as each node can operate with a full copy of the stored data, thus at least partially reducing downtime due to localized network outages and hardware failures. The system can also increase the reliability of data transfers in a network environment having reliable and unreliable peers, as each node broadcasts messages to all connected peers, and, as each block comprises a link to a previous block, a node can quickly detect a missing block and propagate a request for the missing block to the other nodes in the blockchain network.

The particular blockchain implementation described herein provides improvements over technology by using a decentralized database and improved processing environments. In particular, the blockchain implementation improves computer performance by, for example, leveraging decentralized resources (e.g., lower latency). The distributed computational resources improves computer performance by, for example, reducing processing times. Furthermore, the distributed computational resources improves computer performance by improving security using, for example, cryptographic protocols.

As used herein, "electronic communication" means communication of at least a portion of the electronic signals with physical coupling (e.g., "electrical communication" or "electrically coupled") and/or without physical coupling and via an electromagnetic field (e.g., "inductive communication" or "inductively coupled" or "inductive coupling"). As used herein, "transmit" can include sending at least a portion of the electronic data from one system component to another (e.g., over a network connection). Additionally, as used herein, "data," "information," or the like can include encompassing information such as commands, queries, files, messages, data for storage, and the like in digital or any other form.

With reference to FIG. 1, a system 100 for blockchain based NFT proxy transactions is depicted. System 100 can include various computing devices, software modules, networks, and data structures in communication with one another. System 100 can also contemplate uses in association with web services, utility computing, pervasive and individualized computing, security and identity solutions, autonomic computing, cloud computing, commodity computing, mobility and wireless solutions, open source, biometrics, grid computing and/or mesh computing. System 100 based on a blockchain, as described herein, can simplify and automate non-fungible token transfers and related processes by using the blockchain as a distributed and tamper-proof data store. Transparency is very high using a federated or public blockchain since validation is performed, for example, using data stored by a decentralized autonomous organization (DAO) or in a smart contract instead of a specific financial institution or private database.

With reference to FIG. 1, system 100 can comprise a user 101 (e.g., a user), a user device 120, an NFT issuer system 130, a proxy token application platform 150 (i.e., application platform), and/or a blockchain network 140. Any of these components can be outsourced and/or be in communication with each other through one or more networks (illustrated by dashed arrows). The blockchain network 140 can be in electronic communication with user device 120, NFT issuer system 130, and/or application platform 150, via one or more blockchain nodes, as discussed further herein.

User device 120 can comprise software and/or hardware in communication with the system 100 via a network comprising hardware and/or software configured to allow the user 101, and/or the like, access to the application platform 150 and or blockchain network 140. The user device can comprise any suitable device that is configured to allow user 101 to communicate with a network and the system 100. The user device 120 can include, for example, a personal computer, personal digital assistant, cellular phone, smart phone, tablet, mobile device, kiosk, and/or the like and can allow a user to transmit data and commands to the system 100. The user device 120 described herein can run a web application or native application to communicate with the application platform 150 and/or blockchain network 140. A native application 122 can be installed on the user device 120 via download, physical media, or an app store, for example. The native application 122 can utilize the development code base provided for use with the operating system of the user device 120 and be capable of performing system calls to manipulate the stored and displayed data on the user device 120 and communicate with application platform 150. A web application can be web browser compatible and written specifically to run on a web browser of the user device 120. The web application can thus be a browser-based application that operates in conjunction with application platform 150.

User device 120 can include a blockchain wallet 124. Blockchain wallet 203 can be a HD type as described in further detail below. The blockchain wallet 124 can be in communication with the blockchain network 140 and configured to generate blockchain transaction addresses, store NFTs and proxy tokens, sign and execute transactions of NFTs and proxy tokens and/or the like.

With continued reference to FIG. 1, NFT issuer system 130 can comprise a blockchain software development kit (SDK) 132, an NFT smart contract 134, and/or a blockchain node 136. The aforesaid elements can be in direct logical communication with each other via a bus, network, and/or through any other suitable means, or can be individually connected. NFT issuer system 130 can also include one or more data centers, cloud storages, or the like, and can include software, such as APIs or SDKs, configured to retrieve and write data to the blockchain. NFT issuer system 130 can include one or more processors and/or one or more tangible, non-transitory memories and be capable of implementing logic. The processor can be configured to implement various logical operations in response to execution of instructions, for example, instructions stored on a non-transitory, tangible, computer-readable medium, as discussed further herein.

NFT smart contract 134 is deployed on blockchain network 140 and can be configured to generate an NFT (i.e., mint the NFT). The NFT smart contract 134 can deliver the NFT to the blockchain wallet 124 of user device 120 in response to a payment transaction executed on blockchain network 140. Blockchain SDK 132 can be configured to provide software, services, and interfaces to enable communications between blockchain network 140 and NFT smart contract 134. Blockchain SDK 132 can comprise programmatic libraries configured to translate and transmit queries and commands from NFT issuer system 130 to blockchain network 140. For example, blockchain SDK 310 can be configured to receive payment notifications or request transaction confirmations from blockchain network 140 related to a payment request generated by NFT smart contract 134. Blockchain SDK 310 can comprise one or more NFT issuer-specific cryptographic keys used to perform cryptographic operations. As a further example, blockchain SDK 132 can be configured to translate data retrieved from blockchain network 140 into a format readable by user device 120 or application platform 150, which can include digital signature verification and/or data transformation from a blockchain specific data layout to an application specific data layout.

The application platform 150 can comprise a user interface (UI) module 152, a database 154, a token metadata reader 156 module, a proxy token metadata generator 158 module, a blockchain node 151, and a time-based job scheduler 153. The UI module 152 is configured to provide an interface between the user 101 (via user device 120) to the various systems and modules of the application platform 150. The UI module 152 can send and receive data or commands via a plurality of web pages, APIs, and/or the like or other interfaces and are not necessarily associated with or dependent upon Internet browsers or internet specific protocols. The UI module 152 can comprise software configured to enable the user 101 to interact with the application platform 150 in order to perform the processes described herein including the validation of NFT ownership and minting of proxy tokens.

The UI module 152 can include a blockchain wallet connection page, an asset wallet address input page, an NFT selection page, a storage wallet address input page, a selection verification page, an initialize proxy token mint page, a NFT transfer instruction page, a NFT ownership verification confirmation page, a minting confirmation page, and an active proxy token display page.

Database 154 is a data repository that can be configured to store a wide variety of information related to NFTs, proxy tokens, and application platform users. While depicted as a single logical entity in FIG. 1, those of skill in the art will appreciate that database 154 can include multiple physical and/or logical data sources. Database 154 stores one or more of NFT IDs, proxy token IDs, proxy token metadata, URL links to proxy token metadata, a proxy token validity flag, and or the like. Each proxy token is associated with a unique set of metadata and the metadata can be associated with a unique URL to enable web based access to the proxy token metadata. The database 154 can store metadata elements for each proxy token such as 'name', 'description', 'external_url', and 'image'. The name and description elements can be text strings comprising, respectively, a name for the NFT and a description of the NFT. The external_url element can comprise a URL link to view the stored metadata associated with the proxy token ID. The image metadata element can comprise an image file or a URL pointing to an image file related to the proxy token and stored in the database 154. The proxy token metadata can include the validity flag.

Any databases discussed herein can include relational, hierarchical, graphical, or object-oriented structure and/or any other database configurations. Common database products that can be used to implement the databases include DB2 by IBM (Armonk, NY), various database products available from Oracle Corporation (Redwood Shores, CA), Microsoft Access or Microsoft SQL Server by Microsoft Corporation (Redmond, Washington), MySQL by MySQL AB (Uppsala, Sweden), Ehcache, Couchbase, VoltDB, Versant, Hazelcast, or any other suitable database product, for example a persistent and distributed in-memory database product. Moreover, the databases can be organized in any suitable manner, for example, as data tables or lookup tables. Each record can be a single file, a series of files, a linked series of data fields or any other data structure. Association of certain data can be accomplished through any desired data association technique such as those known or practiced in the art. For example, the association can be accomplished either manually or automatically. Automatic association techniques can include, for example, a database search, a database merge, GREP, AGREP, SQL, using a key field in the tables to speed searches, sequential searches through all the tables and files, sorting records in the file according to a known order to simplify lookup, and/or the like. The association step can be accomplished by a database merge function, for example, using a "key field" in pre-selected databases or data sectors. Various database tuning steps are contemplated to optimize database performance. Examples include distributing data elements to grid memory, optimizing partitioning of memory objects to process, indexing frequently used files and placing on separate file systems to reduce Input/Output ("I/O") bottlenecks.

The token metadata reader 156 can be executable to import metadata elements associated with an NFT minted by NFT issuer system 130. In response to receiving an NFT ID, the token metadata reader 156 can extract NFT metadata from the blockchain network and/or the NFT issuer system 130 related to the NFT ID. The token metadata reader 156 can extract each of the 'name', 'description', 'external_url', and 'image' metadata elements associated with the NFT ID and pass the extracted elements to the proxy token metadata generator 158.

The proxy token metadata generator 158 can be executable to read the imported metadata associated with the NFT and generate proxy token metadata based on the metadata associated with the NFT. The token metadata generator 158 can be configured to listen for event messages from the proxy token smart contract 142 such as a mint proxy token event. In response to receiving the mint proxy token event message, the proxy token metadata generator 158 can execute the proxy token metadata generation process. The token metadata generator 158 can generate the unique URL associated with the proxy token ID and populate the 'external_url' metadata element. The token metadata generator 158 can be configured to process the name metadata element to append the keyword "Proxy" at the beginning of the name text string. For example, if the imported 'name' element is {{ORIGINAL NFT NAME}} the post processed metadata element can read {{Proxy ORIGINAL NFT NAME}}. The token metadata generator 158 can be configured to process the description metadata element to append additional descriptive text to the text string. For example, if the imported 'description' element is {{DESCRIPTIVE TEXT}} the post processed metadata element can read {{Proxy token of the ORIGINAL NFT NAME NFT. This token is not a real NFT, it is a proxy token that represents the original NFT for limited purposes. This token is used to interact with the original NFT. DESCRIPTIVE TEXT}}. The token metadata generator 158 is configured to process image files associated with or stored as the image metadata element to add a watermark to the image. In this regard, the proxy token image metadata element is differentiated and distinguishable from the related NFT image metadata element. The token metadata generator 158 can store the generated proxy token metadata in the database 154.

The time-based job scheduler 153 can be executable to perform various time based tasks and/or perform function calls (described in further detail below) to the proxy token smart contract 142. The time-based job scheduler can be configured to periodically check if each of the proxy tokens created by the proxy token smart contract 142 (via the application platform 150) are valid. If the system discovers an invalid proxy token, the proxy token is scheduled for removal from the proxy token smart contract and the corresponding database data is deleted. For example, time-based job scheduler 153 can execute a task to periodically check the proxy token validity flag to determine whether the flag is set to invalid. In response to determining the invalid setting, the time-based job scheduler can execute a task to purge the database 154 entry associated with the proxy token from the database module and remove the proxy token from the smart contract (e.g., via the burn proxy token function).

Blockchain network 140 is configured to maintain a blockchain. Blockchain network 140 can be a peer-to-peer network that is private, federated, and/or public in nature (e.g., ETHEREUM®, Bitcoin, Hyperledger® Fabric, Polygon, etc.). Federated and private networks can offer improved control over the content of the blockchain, and public networks can leverage the cumulative computing power of the network to improve security. Blockchain network 140 can comprise various blockchain nodes (e.g., consensus participants) in electronic communication with each other, as discussed further herein. Each blockchain node can comprise a computing device configured to write blocks to the blockchain and validate blocks of the blockchain. The computing devices can take the form of a computer or processor, or a set of computers and/or processors or application specific integrated circuits (ASICs), although other types of computing units or systems can also be used. Exemplary computing devices include servers, pooled servers, laptops, notebooks, handheld computers, personal digital assistants, cellular phones, smart phones (e.g., iPhone®, BlackBerry®, Android®, etc.) tablets, wearables (e.g., smart watches and smart glasses), Internet of things (IOT) devices or any other device capable of receiving data over network. Each computing device can run applications to interact with blockchain network 140, communicate with other devices, perform crypto operations, and otherwise operate within system 100. Computing devices can run a client application that can be a thin client (web), hybrid (i.e. web and native, such as iOS and Android), or native application to make API calls to interact with the blockchain, such as a web3 API compatible with blockchain databases maintained by ETHEREUM®.

Blockchain network 140 can include a distributed ledger that maintains records in a readable manner and that is resistant to tampering. Blockchain network 140 can be based on blockchain technologies such as, for example, ETHEREUM®, Open Chain, Chain Open Standard, HYPERLEDGER® Fabric, CORDA CONNECT®, INTEL® Sawtooth, etc. Blockchain network 140 can comprise a ledger of interconnected blocks containing data. The ledger of interconnecting blocks containing data can be interconnected by reference to the previous block. Each block can include a link to the previous block and can include a timestamp. Each block can hold one or more of micro-payment transaction clearance credits, micro-payment transaction debits, account holder account smart contracts, directory smart contracts, payment addresses, transaction addresses, and/or the like. When implemented in support of system 100, blockchain network 140 can serve as an immutable log of transactions in system 100. Blockchain network 140 can be maintained on various blockchain nodes (e.g., blockchain node 540, a second blockchain node, a third blockchain node, etc.) in the form of copies or partial copies of the blockchain network, as discussed further herein. Blocks (e.g., including micro-payment transaction clearance credits, micro-payment transaction debits, account holder account smart contracts, directory smart contracts, payment addresses, transaction addresses, etc.) can be written to blockchain network 140 by establishing consensus between the blockchain nodes based on proof of work, proof of stake, practical byzantine fault tolerance, delegated proof of stake, or other suitable consensus algorithms. In this regard, data can be added to the blockchain by establishing consensus between network participants (e.g., the blockchain nodes). The system can be associated with multiple different blockchain networks. For example, proxy tokens can be generated on a first blockchain network and underlying asset such as an NFT can be on a different blockchain network. Thus, the system can be said to be chain-agnostic.

A blockchain address can be uniquely assigned to each blockchain node or participant to function as a unique identifier for each participant in blockchain network 140. For example, each participant can register with blockchain network 140, and/or an existing trust participant (e.g., identity provider), and can be assigned and provided a private key and public key pair. Blockchain network 140 can use a Hierarchical Deterministic (HD) solution to enable the creation of one or more child keys from one or more parent keys in a hierarchy. Each child key can be assigned to a participant in blockchain network 140. For example, blockchain network 140 can use BIP32, BIP39, and/or BIP44 to generate an HD tree of public addresses.

Blockchain network 140 can host smart contracts, such proxy token smart contract 142, that can autonomously govern the validation of NFT ownership and control, minting of proxy tokens associated with the NFT, transfers of proxy tokens, and invalidation of proxy tokens, and/or the like by supporting execution and/or recording of data to blockchain network 140. Smart contract 142 can control the end-to-end flow of the system. For example, and as discussed further herein, smart contract 142 can be configured to verify asset wallet ownership of an NFT; verify NFT ownership by validating a transfer from the asset wallet to a storage wallet; minting a proxy token associated with the NFT; invalidating the proxy token; and generating and/or transmitting various statuses, confirmations, or the like. Smart contract 142 can also be configured to store and maintain, for each proxy token, metadata on the blockchain indicating the relationship (linkages) between the proxy token and the underlying NFT from which it was minted.

Proxy token smart contract 142 can be configured to execute one or more read functions including 'fetch initialized proxy token mints', 'get platform fees', 'get proxy token owner', and 'get proxy token Uniform Resource Identifier (URI)'. The smart contract 142 can be configured to execute one or more write functions such as 'initialized proxy token mints', 'mint proxy token', 'burn proxy token' (i.e., removing the proxy token data from the contract), 'transfer token', 'set platform fee', 'set treasury function', and transfer ownership. Smart contract 142 can comprise a program written in a programming language such as, for example, Solidity, or any other suitable programming language. The smart contract can be deployed on the ETHEREUM® network.

The fetch initialized proxy token mints function can receive as input a pair of NFT contract addresses and an NFT ID. The function takes in a pair of NFT Contract address and NFT ID and returns a proxy token ID if there is a proxy token initialized for that NFT. If there is no proxy token initialized with this address, then the function simply returns nothing.

The get platform fees function responds with the platform fee (in Wei) needed for minting a proxy token. Each function performed by the smart contract requires computational resources to execute, these resources are paid for by platform fees. In the case of the ETHEREUM® network fees are paid in ETH and one Wei is the smallest unit of ETH. The get proxy token owner function receives as input the proxy token ID and returns the wallet address of the owner of that proxy token (i.e. the blockchain transaction address where the proxy token is currently stored).

The initialized proxy token mint function receives as input the asset wallet address (i.e., a first blockchain transaction address with the NFT present at the address), a storage wallet address (i.e., a second blockchain transaction address which the NFT will be transferred in order to verify the user's ownership and control of the NFT), the NFT contract address (i.e., the contract address associated with the original minting of the NFT by NFT smart contract 134), and the NFT ID (i.e., the ID of the NFT from which the proxy token will be minted). The function takes in these inputs and initializes the mint proxy token function. The initialization process comprises several steps: first the proxy token contract 142 checks if the NFT contract address of the NFT smart contract 134 is whitelisted or not. Platform 150 can maintain a whitelist in database 154 of approved NFT smart contracts. The proxy token smart contract 142 can call the application platform 150 and compare the NFT contract address to the whitelist and proceed only where there is a match. If no match is found the process halts and returns an error message. Next the function checks if the NFT is owned by the asset wallet (i.e., is the NFT stored at the asset wallet address). If the NFT is not owned by the asset wallet, the function halts and returns an error message. If the NFT is owned by the wallet address, the function saves the storage wallet address along with the NFT contract address and the NFT ID on the proxy token smart contract 142. Finally, the function uses the storage wallet address, the NFT contract address, and the NFT ID generate a unique proxy token ID.

The mint proxy token function receives as input the proxy token ID and the mint cost (i.e., the platform fee to mint the proxy token). The mint proxy token function takes the proxy token ID then checks to see if the NFT has been moved to the storage wallet address received by the initialized proxy token mint function. If the NFT is present in the storage wallet address, the proxy token is minted to the asset wallet (e.g., a third blockchain transaction address associated with the bitcoin wallet 124 of user 101 and thereby associated with the first blockchain transaction address). The mint proxy token function returns the mint proxy token event message in response to successfully minting the proxy token.

The burn proxy token function receives the proxy token ID and, in response, clears any data stored by the proxy token smart contract 142 related to the proxy token ID. The transfer token function receives the proxy token ID and a blockchain transaction address (the 'to address') and in response executes a transaction of the token from the current address to the to address. Stated another way, this function changes the owner of the proxy token from the current owner to the owner of the 'to address'.

The get proxy token URI function receives as input the proxy token ID and returns the proxy token metadata URL. The proxy token metadata comprises the associated NFT metadata as processed by the proxy token metadata generator 158.

Blockchain nodes (151, 136) can be in electronic communication with blockchain network 140 and can be configured to allow access to blockchain network 140, proxy token smart contract 142, and NFT smart contract 134. Blockchain nodes (151, 136) can be configured to maintain a copy and/or partial copy of blockchain network 140, write to and/or retrieve data and blocks from blockchain network 140, validate blocks of blockchain network 140, and/or propagate writes to proxy token smart contract 142 and NFT smart contract 134 to blockchain network 140. Blockchain nodes (151, 136) can communicate with one or more blockchain nodes (e.g., a third blockchain node, a fourth blockchain node, etc.) to validate and write blocks to blockchain network 140, and to establish consensus between the blockchain nodes based on proof of work, proof of stake, practical byzantine fault tolerance, delegated proof of stake, or other suitable consensus algorithms.

Blockchain nodes (151, 136) can comprise one or more computing devices, such as, for example a computer or processor, or a set of computers, processor, and/or application specific integrated circuits (ASICs), although other types of computing units or system can also be used. Exemplary computing devices can include servers, pooled servers, laptops, notebooks, handheld computers, personal digital assistants, cellular phones, smart phones, tablets, wearables (e.g., smart watches, smart glasses, etc.), Internet of things (IoT) devices, or any other device capable of receiving data over a network. Blockchain nodes (151, 136) can run applications to interact with blockchain network 140, communicate with other devices, perform crypto operations, and otherwise operate within system 100. For example, blockchain nodes (151, 136) can run a client application that can be a thin client (web), a hybrid (i.e., web and native, such as iOS and ANDROID®), or a native application to make application programming interface (API) calls to interact with blockchain network 140, such as a web3 API compatible with blockchain databases maintained by ETHEREUM®.

Figure 2:
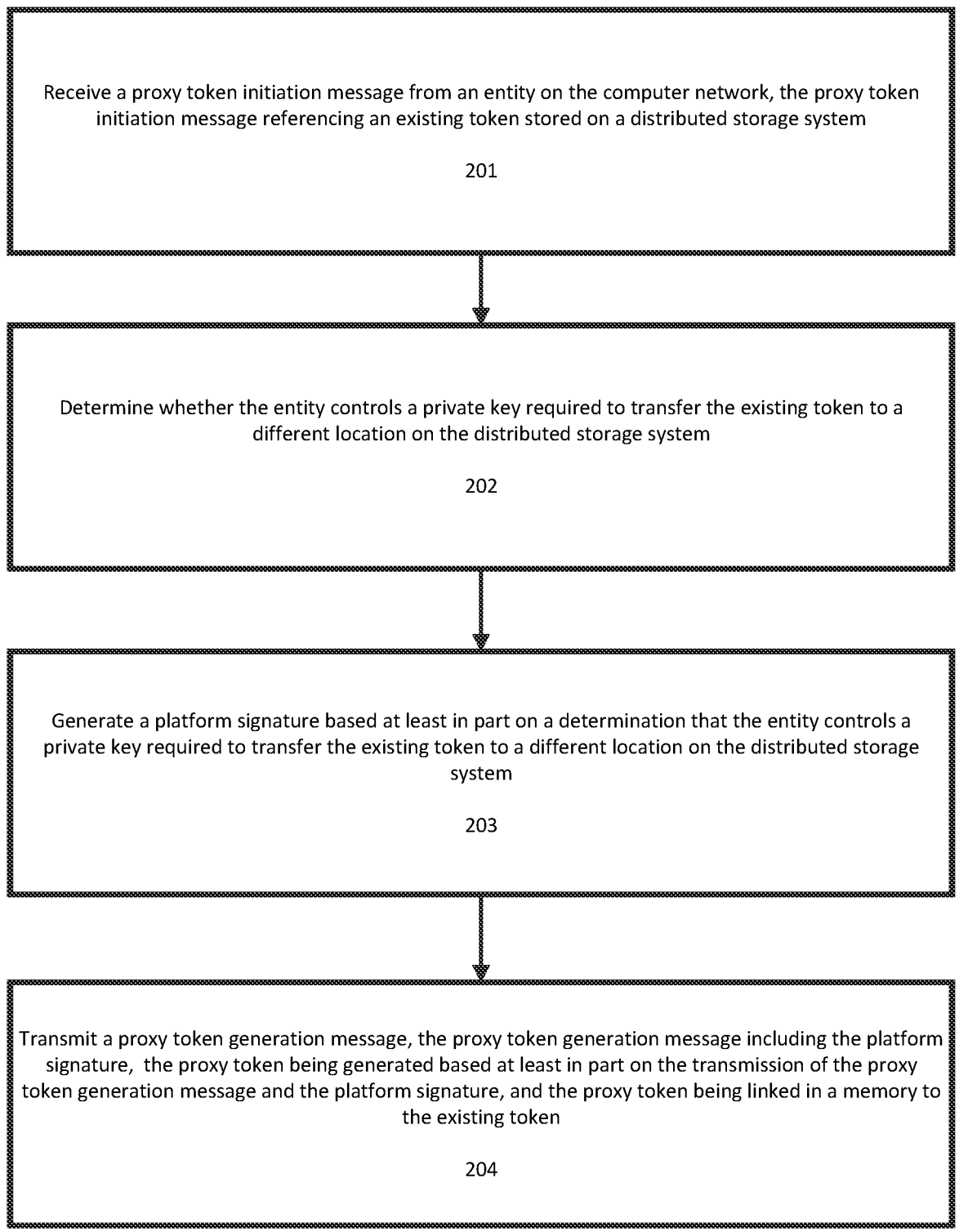
FIG. 2 illustrates a flowchart for generating a proxy token according to an exemplary embodiment.

FIG. 2 illustrates a flowchart for generating a proxy token according to an exemplary embodiment. The steps shown in the flowchart can be performed by the proxy token platform. The proxy tokens corresponding to existing token and can represent ownership or some other interest in the underlying tokens, as discussed below. The proxy tokens and the existing tokens can be stored on one or more blockchains and can be non-fungible tokens (NFT), as discussed previously and further discussed below.

At step 201 a proxy token initiation message is received from an entity on the computer network, the proxy token initiation message referencing an existing token stored on a distributed storage system. The entity can be a user on a frontend system that communicates with the proxy token platform or a user on a user interface of the proxy token platform itself. The entity can also be a computing system or server corresponding to a non-user entity, such as a company, government, or other entity. The proxy token initiation message can include a number of details, as discussed below, such as identifying information of an entity, wallet information/address, etc. The proxy token initiation message also specifies one or more existing tokens (e.g., NFTs) in distributed storage (e.g., a blockchain) for which proxy tokens are desired.

At step 202 a determination is made regarding whether the entity controls a private key required to transfer the existing token to a different location on the distributed storage system. In other words, the system determines whether the entity is an owner of the existing token, since an owner's wallet serves as the private key that allows them to sign transactions corresponding to a particular token or make transactions involving that token.

At step 203 a platform signature is generated based at least in part on a determination that the entity controls a private key required to transfer the existing token to a different location on the distributed storage system. The platform signature is the authorization/approval of the proxy token platform to create a proxy token for the entity.

At step 204 a proxy token generation message is transmitted, the proxy token generation message including the platform signature. The proxy token generation message is transmitted back to the entity, who can then transmit the message to a smart contract on the blockchain to initialize creation of the proxy token. The proxy token is generated based at least in part on the transmission of the proxy token generation message and, optionally, the platform signature. Specifically, the platform signature is required by the smart contract in order to commence minting of the proxy token. Therefore, the entity must transmit (or the platform must transmit) the platform signature for a particular existing token to the smart contract to initiate minting of the proxy token.

Figure 3:
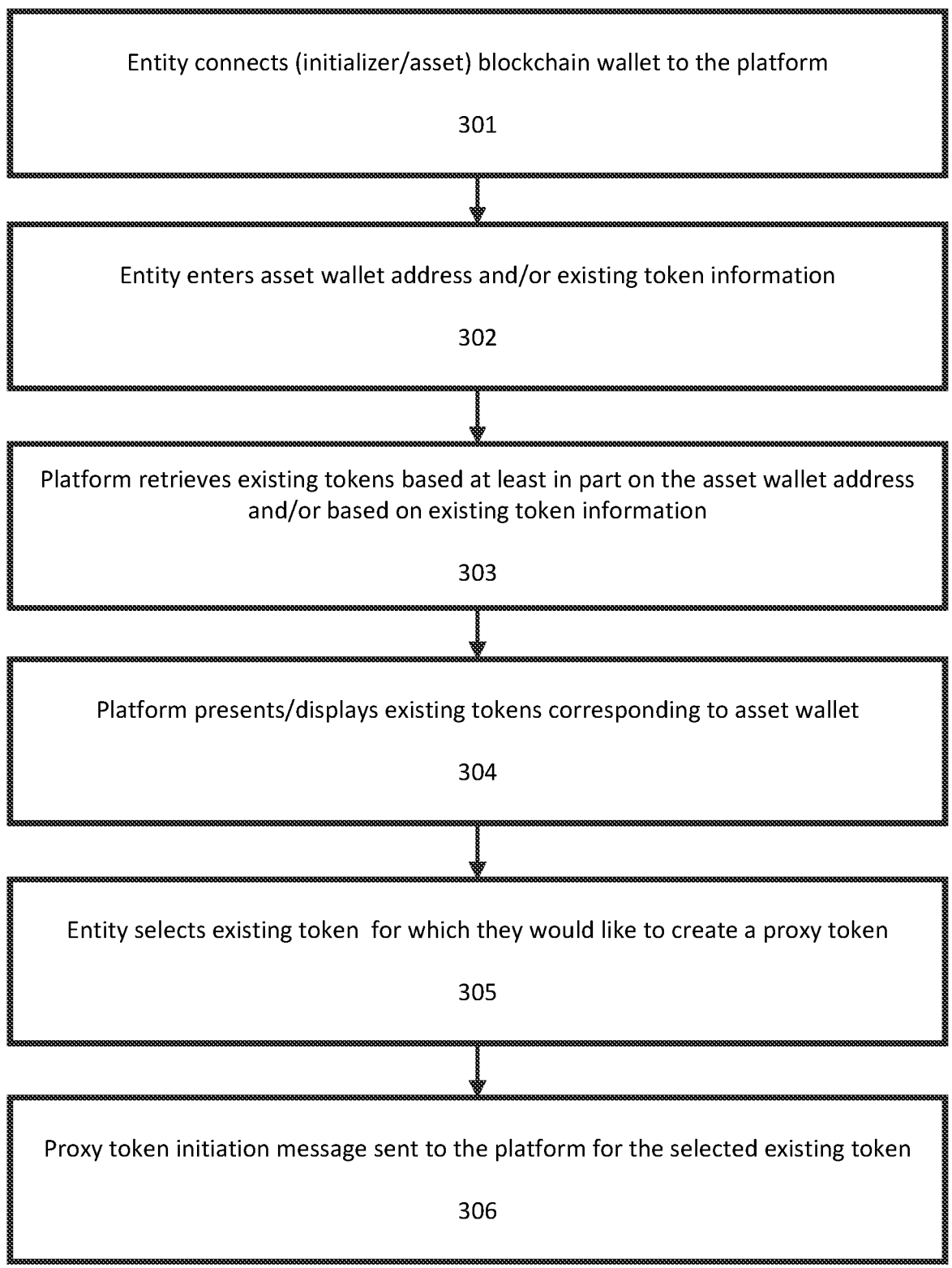
FIG. 3 illustrates an example flowchart for sending a proxy token initiation message to the platform according to an exemplary embodiment.

The proxy token is linked in a memory to the existing token. This linkage can take multiple forms. For example, the proxy token can be linked to the existing token in metadata associated with the proxy token on a blockchain. An identifier or identifying information of the existing token can be included in the metadata used to create the proxy token so that the identifying information corresponding to the existing token is stored on the blockchain in association with the proxy token. The proxy token can also be linked to the existing token in a database external to a blockchain storing the proxy token, such as a database stored on the proxy token platform. The database on the proxy token platform can include store the correspondence between each proxy token and the existing token upon which it is based/which it represents ownership of. The status of existing tokens and proxy tokens listed in this database can be updated on a regular basis FIG. 3 illustrates an example flowchart for sending a proxy token initiation message to the platform according to an exemplary embodiment.

At step 301 an entity connects a blockchain wallet to the platform. This wallet can be used by the entity to sign required transactions to mint the proxy token and/or prove ownership of the existing token. In the event that the entity is uncomfortable connecting their actual asset wallet (which stores existing tokens or other valuables), the entity has the option of using an initializer wallet separate from their asset wallet for the express purpose of signing transactions on the proxy token platform.

At step 302 the entity enters asset wallet address and/or existing token information. The asset wallet stores existing tokens owned by the user (i.e., existing tokens for which the entity controls a private key required to transfer the existing tokens to different locations and/or sign transactions). The user can connect the wallet by providing the public address of the wallet, allowing the platform to identify which existing tokens correspond to that wallet. The entity can also provide existing token information, such as the token chain. This information can be used to retrieve/identify the relevant existing tokens when the entity has existing tokens across multiple blockchains.

At step 303 the platform retrieves existing tokens based at least in part on the asset wallet address and/or based on existing token information. The wallet address functions similar to a bank account number and can be used to look up the existing tokens/assets owned by the entity.

At step 304 the platform presents/displays existing tokens corresponding to asset wallet. The existing tokens can be presented in a user interface on a frontend communicatively coupled to the platform and/or a frontend of the platform itself.

At step 305 the entity selects existing token for which they would like to create a proxy token. The entity can optionally select more than a single token if they desire to create multiple proxy tokens.

At step 306 the proxy token initiation message is sent to the platform for the selected existing token. As an alternative to steps 303-305, the entity can provide the identifying information for the existing token directly to the platform as part of a proxy token initiation message, without first requesting existing tokens and selecting from those existing tokens.

Figure 4:
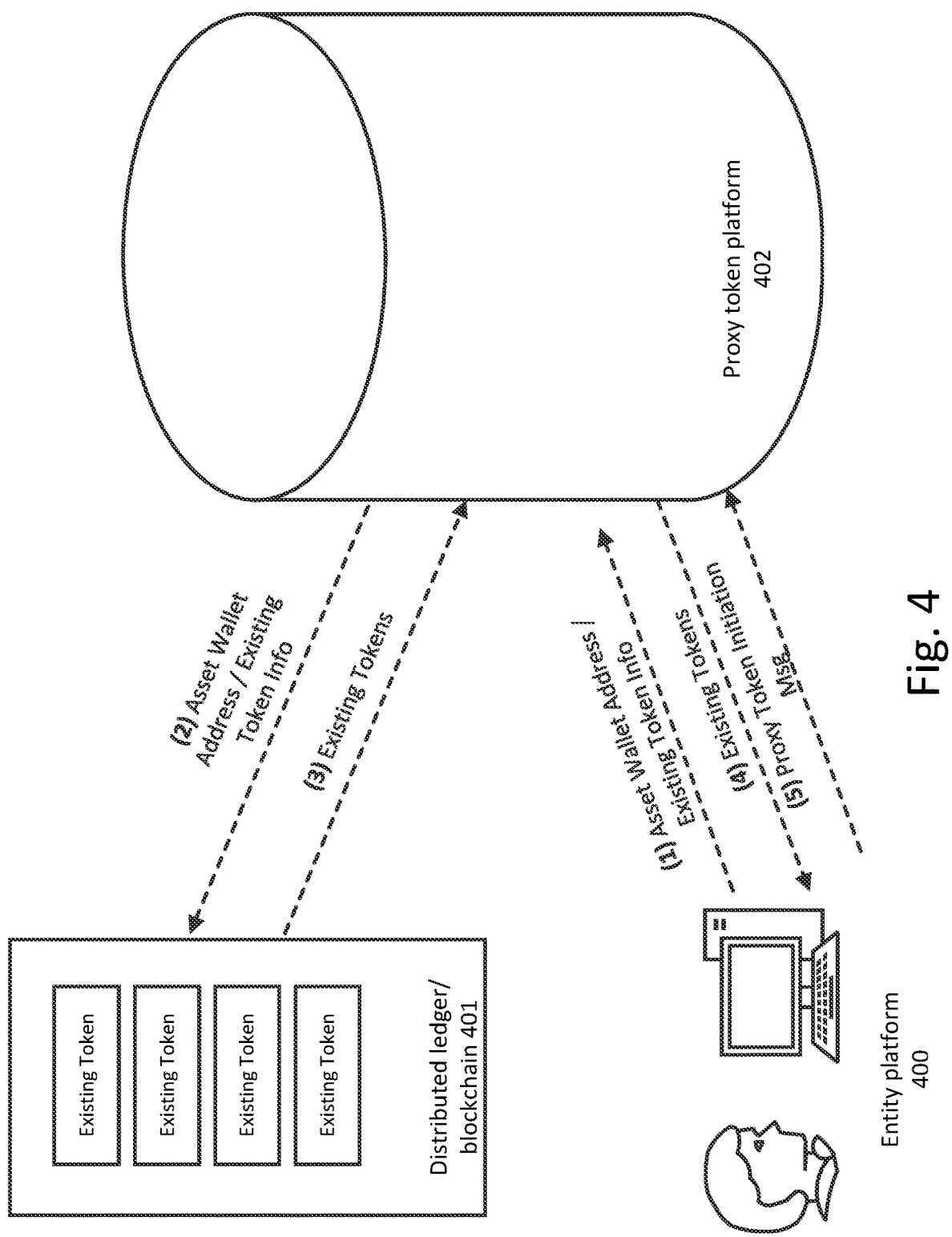
FIG. 4 illustrates an example of sending a proxy token initiation message according to an exemplary embodiment.

FIG. 4 illustrates an example of sending a proxy token initiation message according to an exemplary embodiment. As shown in FIG. 4, the entity platform 400 first provides an asset wallet address and existing token info to the proxy token platform 402. The entity platform 400 can be a client device on a computer network that is in communication with the proxy token platform 402. The entity platform 400 can also be a user interface/frontend portion of the proxy token platform 402. The proxy token platform 402 then uses that information to communicate with the distributed ledger/blockchain 401 and retrieve existing tokens corresponding to the entity. The existing token information is then sent from the proxy token platform 402 to the entity platform 400. The entity platform 400 can then be used to select one or more existing tokens as the basis for the proxy token(s) (sometimes referred to herein as seed existing tokens) and a proxy token initiation message is sent back to the proxy token platform (402). The proxy token initiation message can include all required information, such as entity information, wallet information/address, and existing token identifying information.

Figure 5:
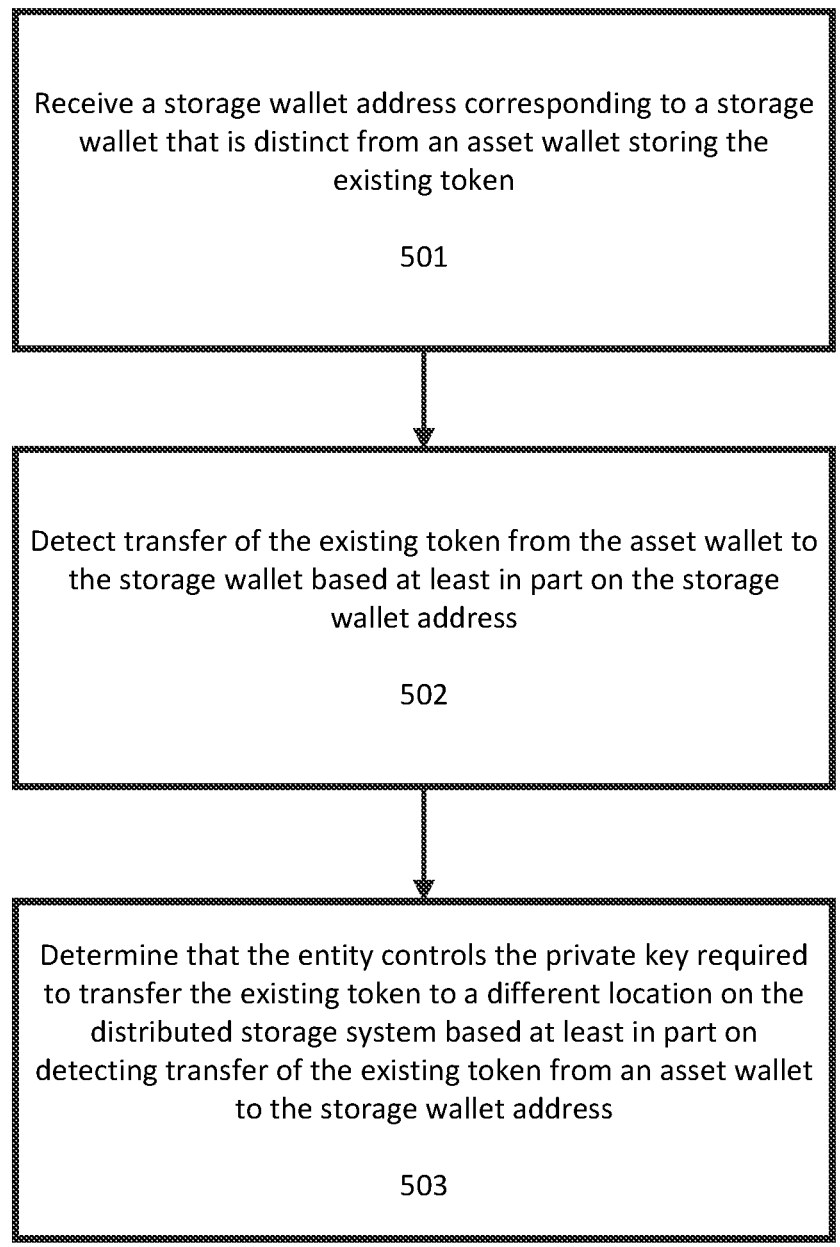
FIG. 5 illustrates a flowchart for determining that an entity controls a private key required to transfer the existing token to a different location on the distributed storage system according to an exemplary embodiment.

FIG. 5 illustrates a flowchart for determining that an entity controls a private key required to transfer the existing token to a different location on the distributed storage system according to an exemplary embodiment. The process shown in FIG. 5 is a trustless process that can be used to confirm that an entity controls a private key required to transfer the existing token to a different location on the distributed storage system (i.e., confirm that an entity owns the existing token). The trustless process can be used when the entity does not want to explicitly connect their asset wallet to the platform or use their asset wallet to sign transactions.

At step 501 a storage wallet address corresponding to a storage wallet that is distinct from an asset wallet storing the existing token is received by the proxy token platform. The storage wallet address is provided by the entity to the platform and does not necessarily have to be a wallet that is owned by the entity. In certain situations, depending on the third party application and specific rules utilized, a storage wallet address can be provided that is not owned by the entity. In other cases, the storage wallet address will be owned by the entity. In any case, the storage wallet is a wallet that does not yet possess the existing token which is to be linked to the proxy token. The storage wallet can be, for example, a cold wallet, which stores private keys offline.

At step 502 transfer of the existing token from the asset wallet to the storage wallet is detected by the proxy token platform based at least in part on the storage wallet address. After providing the storage wallet address to the proxy token platform, the entity arranges for the seed existing token to be transferred from the current wallet (i.e., the asset wallet) to the storage wallet. The proxy token platform can then read the metadata and ownership information associated with the existing token on the blockchain to determine that the existing token has been transferred to the location (i.e, the storage wallet) pre-specified by the entity.

At step 503 a determination is made that the entity controls the private key required to transfer the existing token to a different location on the distributed storage system based at least in part on detecting transfer of the existing token from an asset wallet to the storage wallet address. Since the entity has pre-specified the storage wallet address and then arranged for the existing token to be transferred to the storage wallet, this demonstrates that the entity controls the private key required to transfer the existing token to a different location on the blockchain (i.e., that the entity owns or owned the existing token at the time the proxy token initiation request was made).

Figure 6:
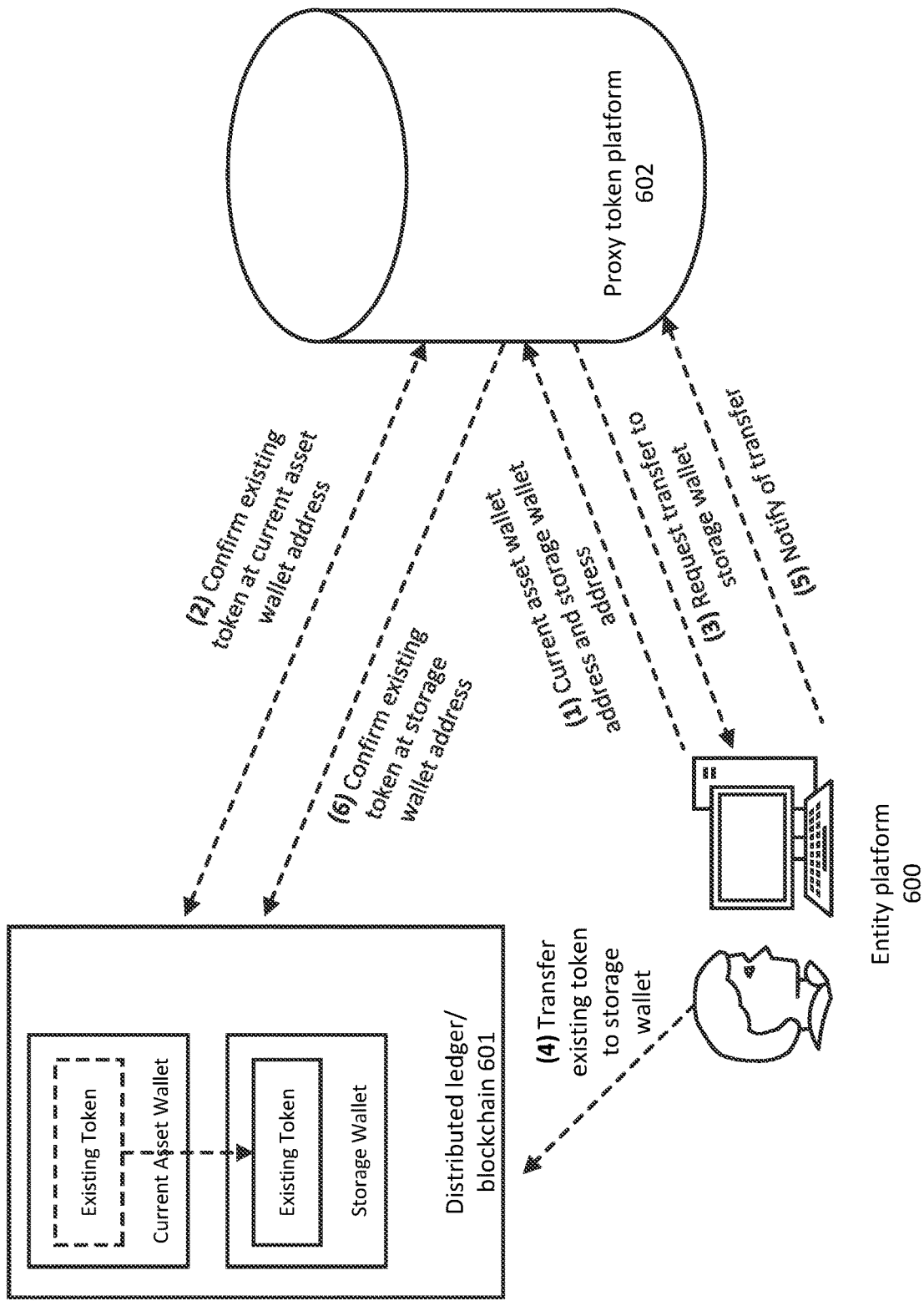
FIG. 6 illustrates an example of determining that an entity controls a private key required to transfer the existing token to a different location on the distributed storage system according to an exemplary embodiment.

FIG. 6 illustrates an example of determining that an entity controls a private key required to transfer the existing token to a different location on the distributed storage system according to an exemplary embodiment. The example shown in FIG. 6 utilizes the trustless process described above. As shown in FIG. 6, the current asset wallet address of the existing token and a storage wallet address are provided by the entity platform 600 to the proxy token platform 602. The proxy token platform 602 then confirms that the existing token is at the current asset wallet address by checking the distributed ledger/blockchain 601. The proxy token platform 602 then sends a request to the entity platform 600 to transfer the existing token to the storage wallet. The entity platform 600 then transfers the existing token to the storage wallet. The entity platform 600 then notifies the proxy token platform 602 of the transfer. The proxy token platform 602 then checks the blockchain 601 to confirm that the existing token is at the storage wallet address.

Figure 7:
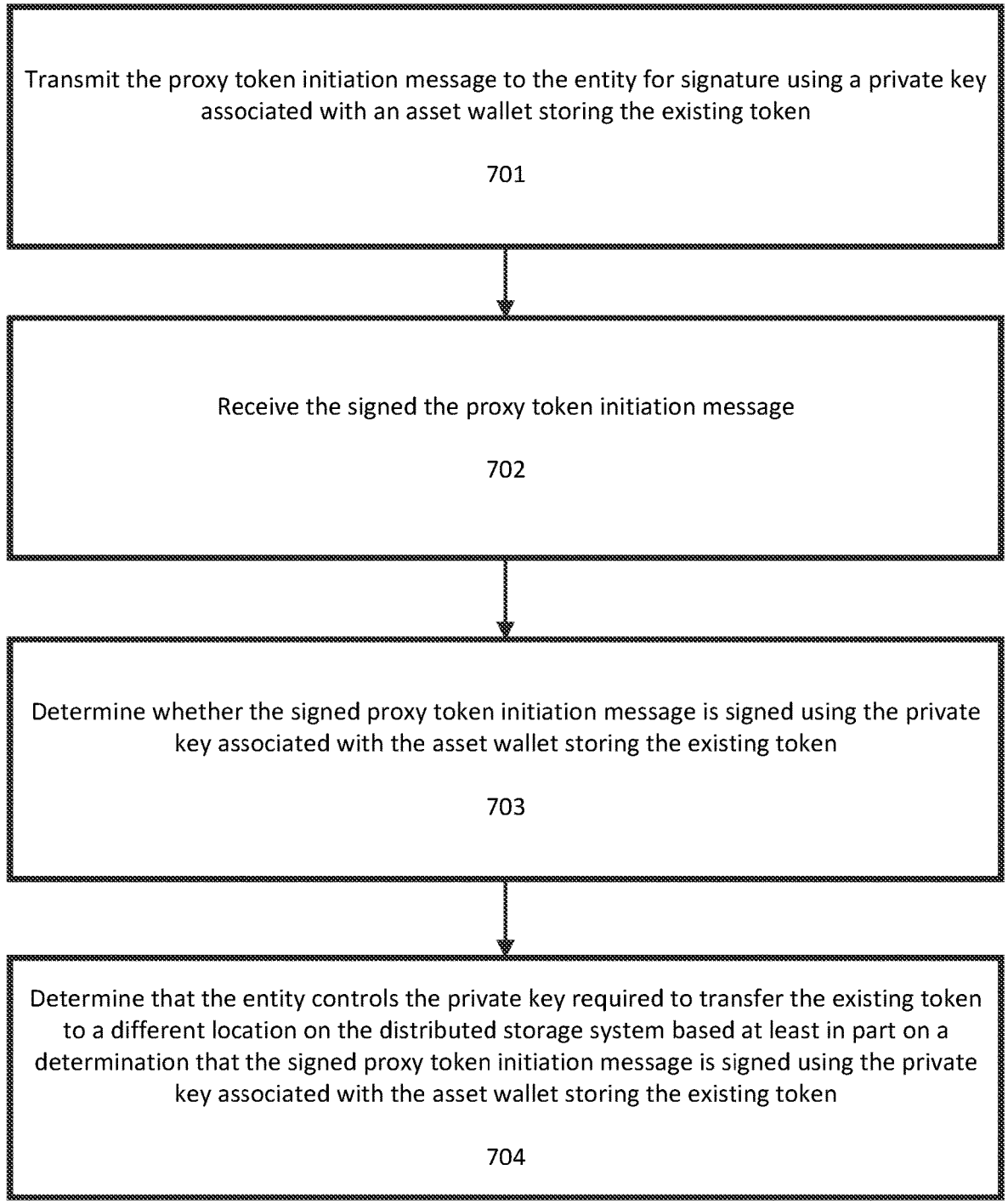
FIG. 7 illustrates another flowchart for determining that an entity controls a private key required to transfer the existing token to a different location on the distributed storage system according to an exemplary embodiment.

FIG. 7 illustrates another flowchart for determining that an entity controls a private key required to transfer the existing token to a different location on the distributed storage system according to an exemplary embodiment. The process shown in FIG. 7 is a trusted process that can be used to confirm that an entity controls a private key required to transfer the existing token to a different location on the distributed storage system (i.e., confirm that an entity owns the existing token). The trusted process can be used when the entity is comfortable connecting their asset wallet to the platform or using their asset wallet to sign transactions.

At step 701 the proxy token initiation message is transmitted from the proxy token platform to the entity for signature using a private key associated with an asset wallet storing the existing token. The entity then connects their asset wallet to the entity platform (if not already connected) and signs the proxy token initiation message using the asset wallet.

The entity platform then transmits the signed proxy token initiation message back to the proxy token platform. At step 702 the signed the proxy token initiation message is received by the platform.

At step 703 a determination is made regarding whether the signed proxy token initiation message is signed using the private key associated with the asset wallet storing the existing token. This determination can be performed using a public key corresponding to the asset wallet.

At step 704 a determination is made that the entity controls the private key required to transfer the existing token to a different location on the distributed storage system based at least in part on a determination that the signed proxy token initiation message is signed using the private key associated with the asset wallet storing the existing token. In other words, the proxy token platform determines that the entity owns or owned the existing token at the time the proxy token initiation request was made.

Figure 8:
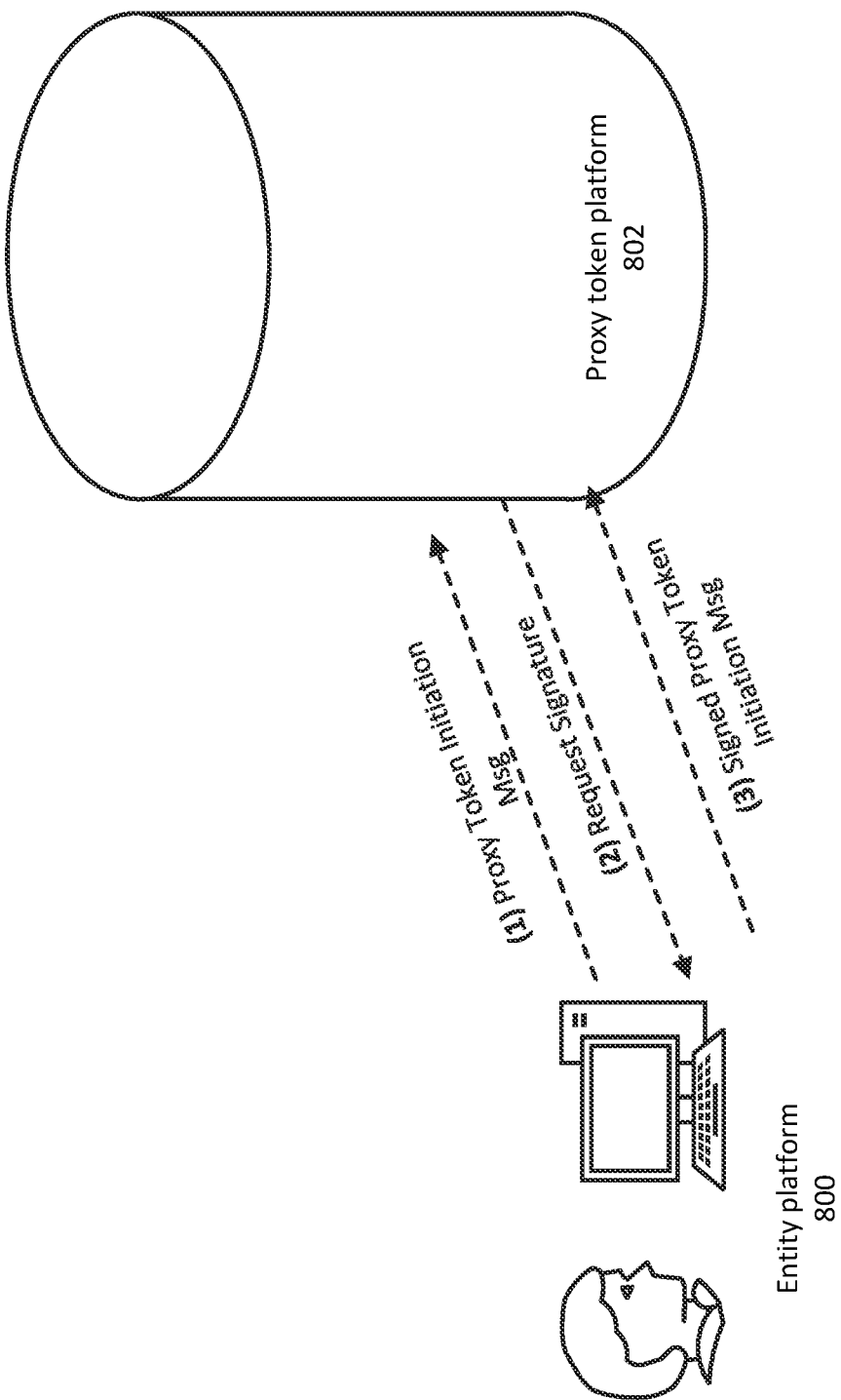
FIG. 8 illustrates another example of determining that an entity controls a private key required to transfer the existing token to a different location on the distributed storage system according to an exemplary embodiment.

FIG. 8 illustrates another example of determining that an entity controls a private key required to transfer the existing token to a different location on the distributed storage system according to an exemplary embodiment. As shown in FIG. 8, a proxy token initiation message is sent from entity platform 800 to proxy token platform 802. The proxy token platform 802 requests the signature (i.e., the signed proxy token initiation message) from the entity platform 800. Specifically, the proxy token platform 802 requests that the proxy token initiation message be signed by an asset wallet that stores the existing token that is the seed token linked to the proxy token to be created. The entity platform 800 then uses the asset wallet to sign the proxy token initiation message and send the signed message back to the proxy token platform 802.

As previously explained with respect to FIG. 2, once the proxy token platform determines that the entity controls a private key required to transfer the existing token to a different location on the distributed storage system (step 202), then a platform signature is generated (step 203) based at least in part on a determination that the entity controls a private key required to transfer the existing token to a different location on the distributed storage system and a proxy token generation message is transmitted (step 204) that includes the platform signature. The proxy token generation message is transmitted back to the entity platform and can be used by the entity platform to mint/generate the proxy token. Specifically, the entity platform can communicate with a smart contract on the blockchain to initialize/mint the proxy token. As discussed below, the smart contract can be configured to require the platform signature in order to initiate the minting process.

Figure 9:
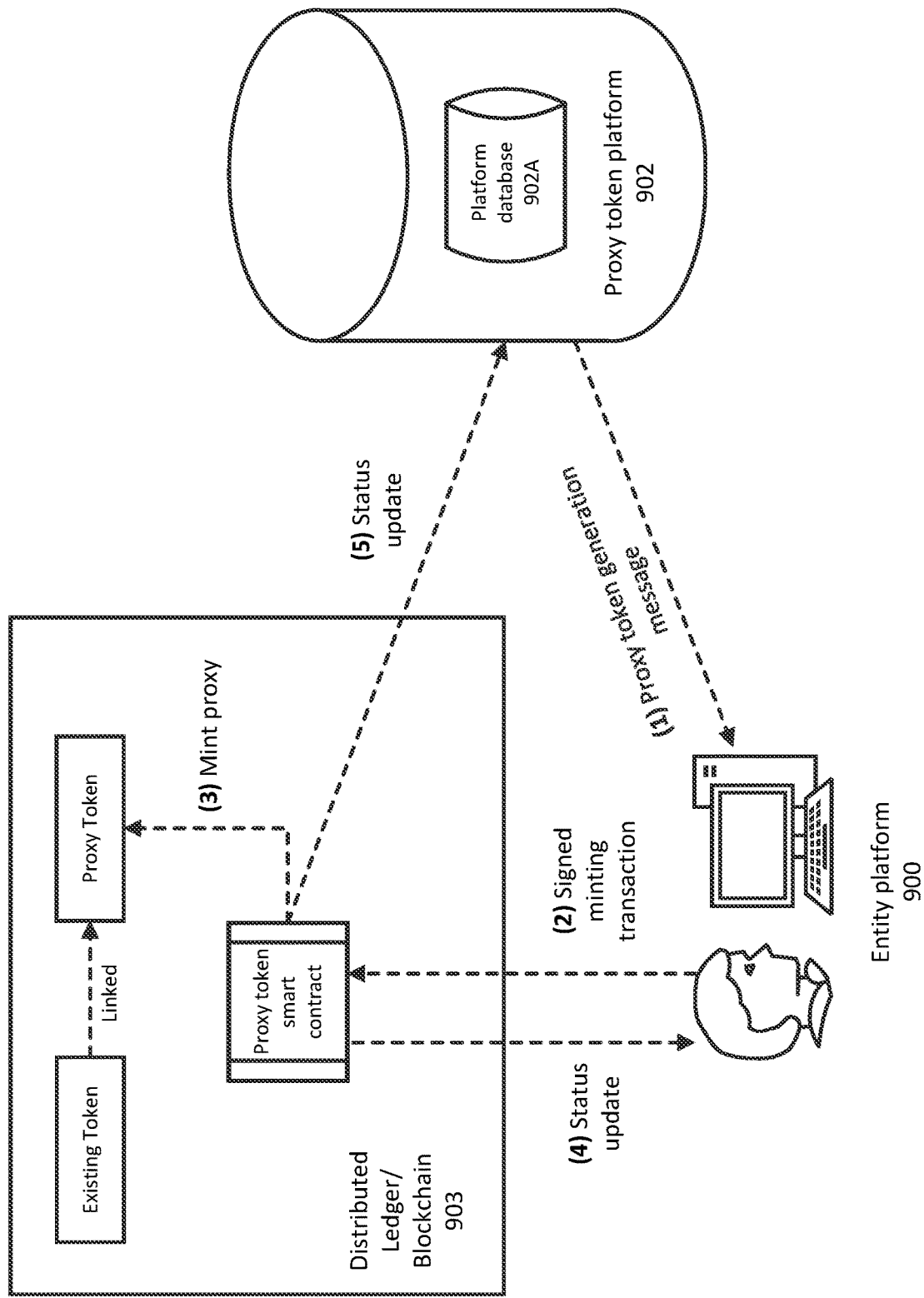
FIG. 9 illustrates an example of transmitting a proxy token generation message and creating a proxy token according to an exemplary embodiment.

FIG. 9 illustrates an example of transmitting a proxy token generation message and creating a proxy token according to an exemplary embodiment. As shown in FIG. 9, the proxy token platform 902 transmits the proxy token generation message (with the platform signature) to the entity platform 900. The proxy token platform 902 can also store the platform signature in its internal database, which is external to the blockchain that will store the proxy token. Entity platform 900 then transmits a signed minting transaction (including the proxy token generation message and/or platform signature) to a proxy token smart contract on the blockchain 903. The entity platform 900 can sign the minting transaction with any suitable wallet (referred to as an initializer wallet). The initializer wallet can be a wallet created just for this purpose or the asset wallet of an entity. The smart contract then initiates minting of the proxy token, which is linked to the existing token. This linkage can be embodied in the metadata of the proxy token (e.g., including information identifying/specifying the existing token linked to the proxy token). A status update including identifying information about the proxy token and other metadata is then sent from the smart contract to the entity platform 900 as well as the proxy token platform 902. The proxy token platform can use the information in this status update to update an internal database 902A that stores linkage information between proxy tokens and the underlying existing tokens that the proxy tokens represent ownership of.

Figure 10:
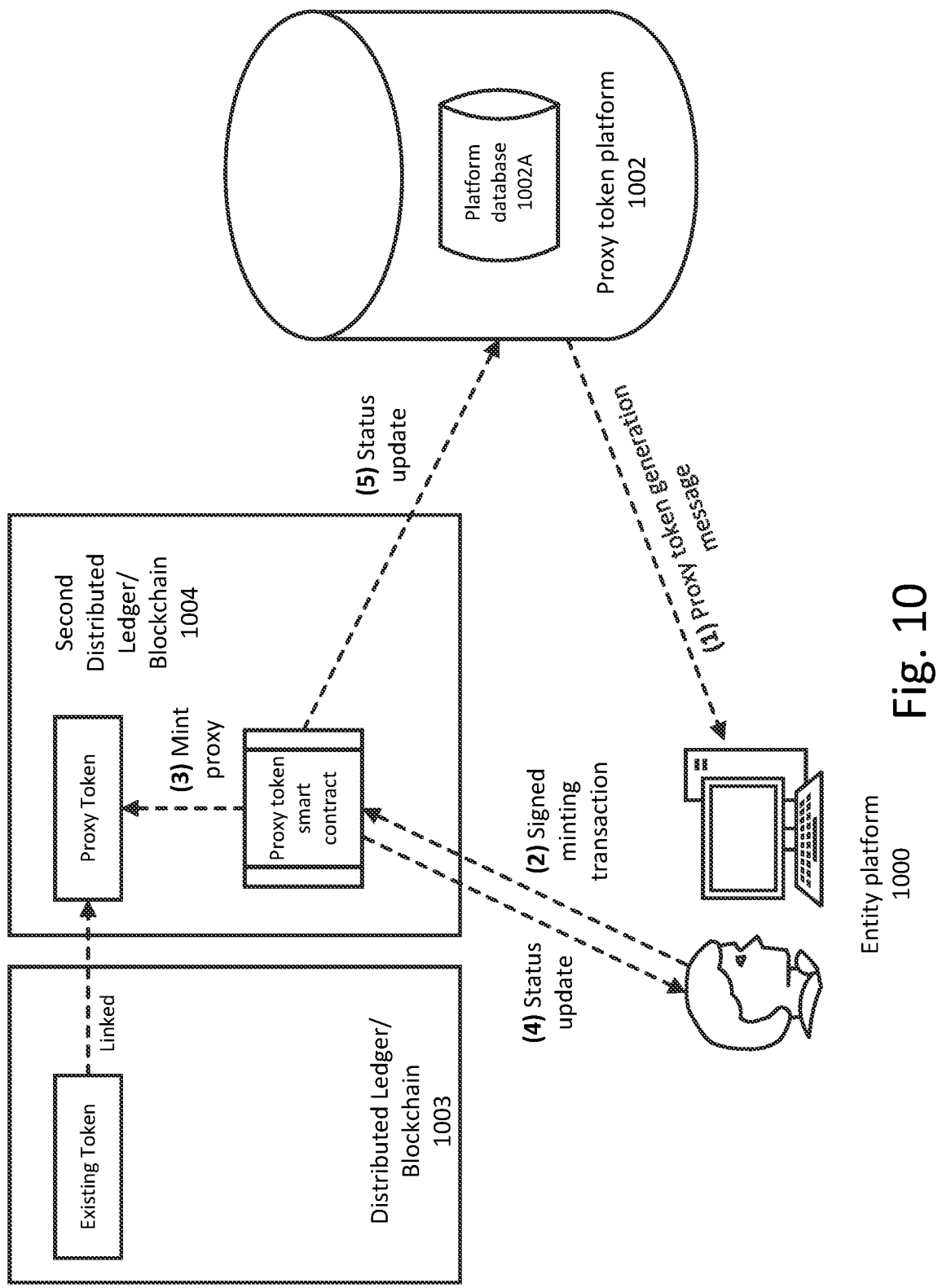
FIG. 10 illustrates another example of transmitting a proxy token generation message and creating a proxy token according to an exemplary embodiment.

FIG. 10 illustrates another example of transmitting a proxy token generation message and creating a proxy token according to an exemplary embodiment. As shown in FIG. 10, the proxy token platform 1002 transmits the proxy token generation message (with the platform signature) to the entity platform 1000. Entity platform 1000 then transmits a signed minting transaction (including the proxy token generation message and/or platform signature) to a proxy token smart contract on the blockchain 1004. The entity platform 1000 can sign the minting transaction with any suitable wallet (referred to as an initializer wallet). The initializer wallet can be a wallet created just for this purpose or the asset wallet of an entity. The smart contract then initiates minting of the proxy token, which is linked to the existing token on blockchain 1003. In this case, the existing (underlying/seed) token and the proxy token are on different blockchain. Nevertheless, the linkage between the existing token and the proxy token can be embodied in the metadata of the proxy token (e.g., including information identifying/specifying the existing token linked to the proxy token). A status update including identifying information about the proxy token and other metadata is then sent from the smart contract to the entity platform 1000 as well as the proxy token platform 1002. The proxy token platform can use the information in this status update to update an internal database 1002A that stores linkage information between proxy tokens and the underlying existing tokens that the proxy tokens represent ownership of.

Figure 11:
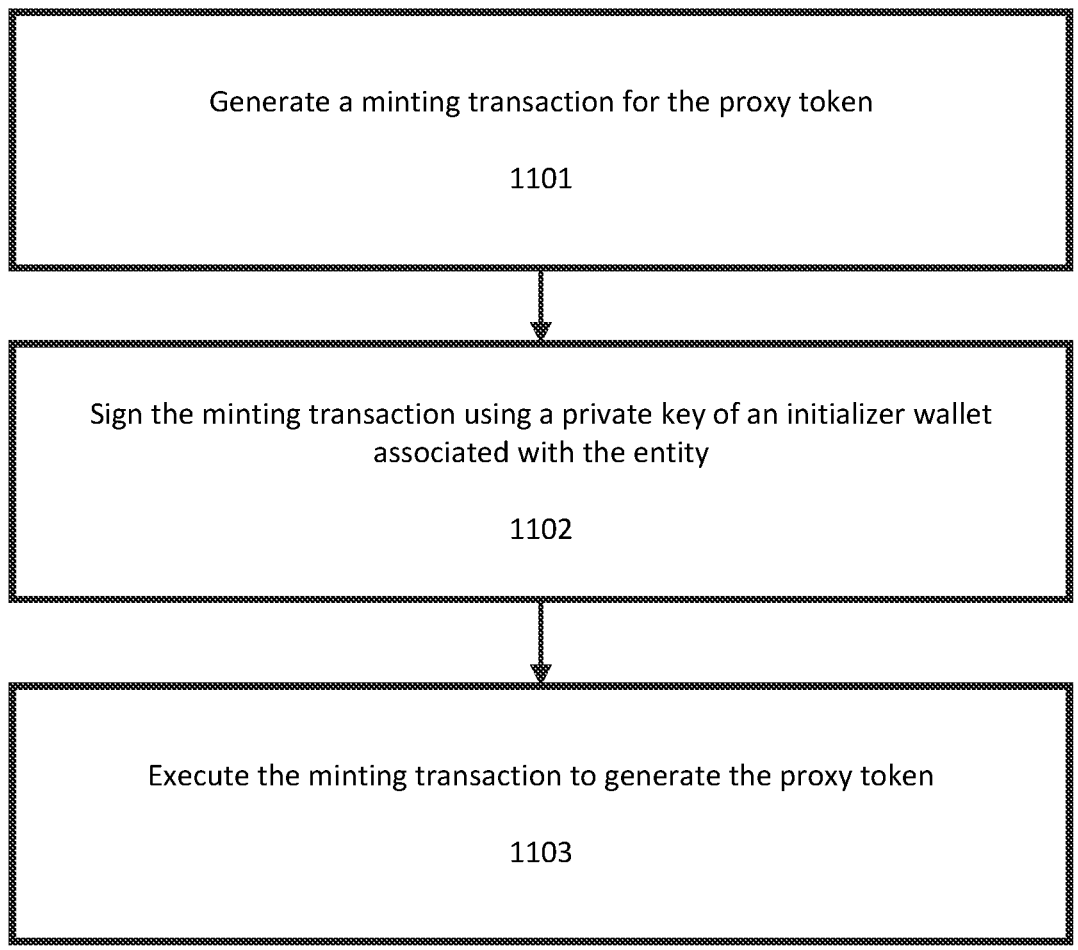
FIG. 11 illustrates a flowchart for generating a proxy token according to an exemplary embodiment.

FIG. 11 illustrates a flowchart for generating a proxy token according to an exemplary embodiment. At step 1101 a minting transaction for the proxy token is generated. The minting transaction is generated by the entity platform after receiving the proxy token generation message from the proxy token platform. The minting transaction can incorporate a portion of, or all of, the proxy token generation message, such as the platform signature that is included in the proxy token generation message.

At step 1102 the minting transaction is signed using a private key of an initializer wallet associated with the entity. As discussed previously, the initializer wallet can be a wallet used by the entity specifically on the entity platform or the initializer wallet can be an asset wallet.

At step 1103 the minting transaction is executed to generate the proxy token. As explained previously, the minting transaction can be executed by a smart contract on the blockchain. Since the minting transaction is signed by a wallet of the entity (i.e., the initializer wallet), the entity pays any gas/transaction fees associated with minting of the proxy token.

Figure 12:
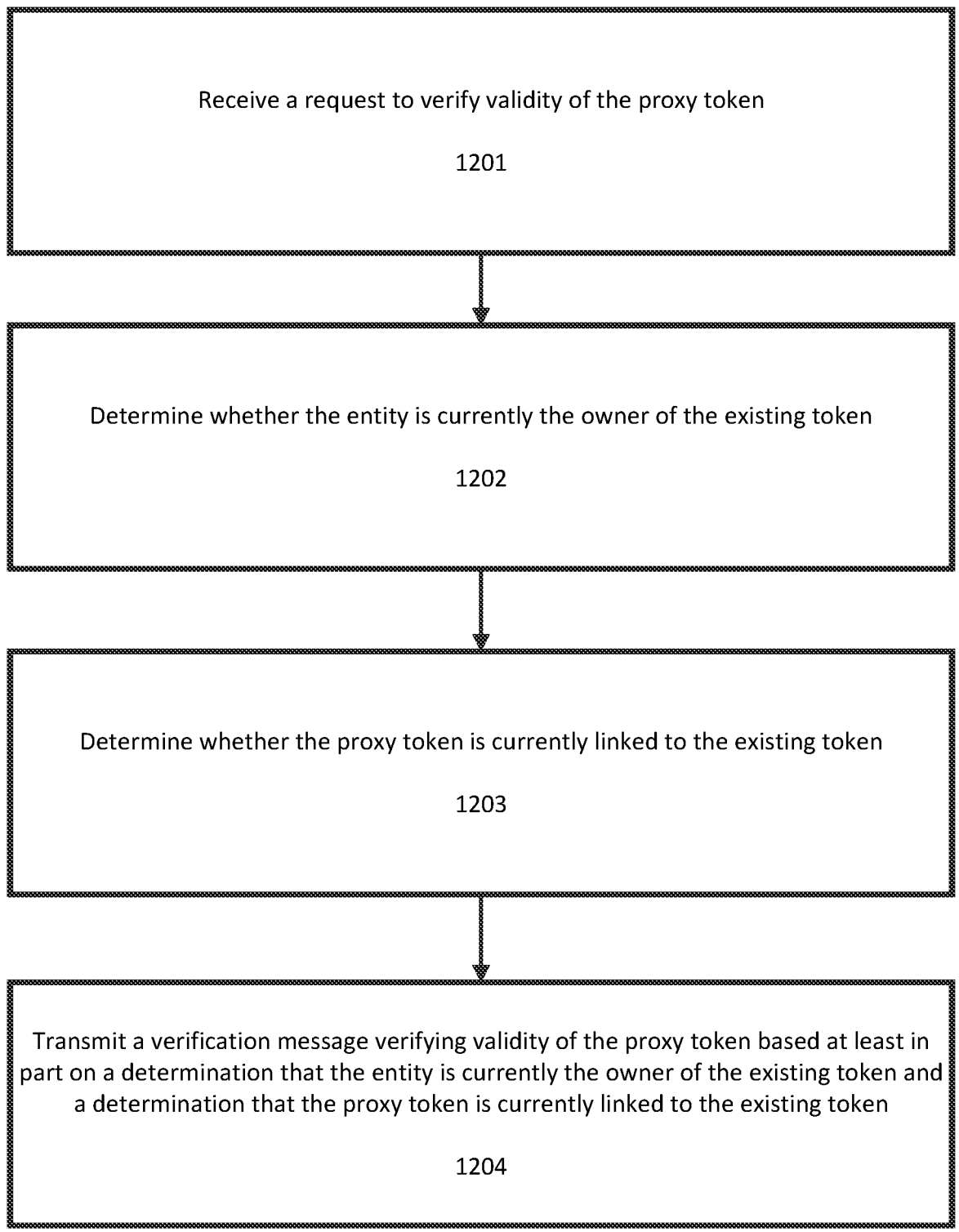
FIG. 12 illustrates a flowchart for verifying validity of the proxy token according to an exemplary embodiment.

FIG. 12 illustrates a flowchart for verifying validity of the proxy token according to an exemplary embodiment. The process of verifying validity of the proxy token can be performed on a periodic basis (as described further below) and can also be performed in response to queries or requests from third party service/content providers via one or more APIs.

At step 1201 a request to verify validity of the proxy token is received by the proxy token platform. If an entity or another party that receives the proxy token from the entity attempts to utilize the proxy token with a service/content provider, then the service/content provider can submit a request to verify validity of the proxy token to the proxy token platform. The request can include identifying information about the proxy token, as well as the entity or other party attempting to use the proxy token.

At step 1202 a determination is made by the platform regarding whether the entity is currently the owner of the existing token. The platform can consult its internal database to look up the existing token linked to the proxy token that is being used. The platform can then lookup the current owner of the existing token and confirm that the current owner is the same owner as the owner at the time of minting of the proxy token. Additionally or alternatively, the platform can communicate with the smart contract on the blockchain or look up the relevant entries in the blockchain to look up the linked existing token and then look up the owner of the existing token.

At step 1203 a determination is made regarding whether the proxy token is currently linked to the existing token (i.e., whether the proxy token is still valid). Depending on the specific use-case for the proxy token, the proxy token can be unlinked from the existing token in different scenarios or under different conditions. For example, the proxy token can have a time condition associated with usage, such that after a predetermined period of time, the proxy token is unlinked from the existing token and/or designated as invalid. In another example, the proxy token can have certain use conditions, such that after one use or a predetermined number of uses, the proxy token is unlinked from the existing token and/or designated as invalid.

At step 1204 a verification message verifying validity of the proxy token is transmitted based at least in part on a determination that the entity is currently the owner of the existing token and a determination that the proxy token is currently linked to the existing token. This verification message can be transmitted back to the requestor that requested verification of validity. Optionally, the verification can be performed based solely on either step 1202 or step 1203 but not both steps. For example, the platform can confirm validity based solely on ownership of the existing token or based upon whether the proxy token is linked to the existing token. The platform can also store one or more flags or counters tracking validity, uses/usage of the proxy token, and/or time remaining for proxy token validity.

Figure 13:
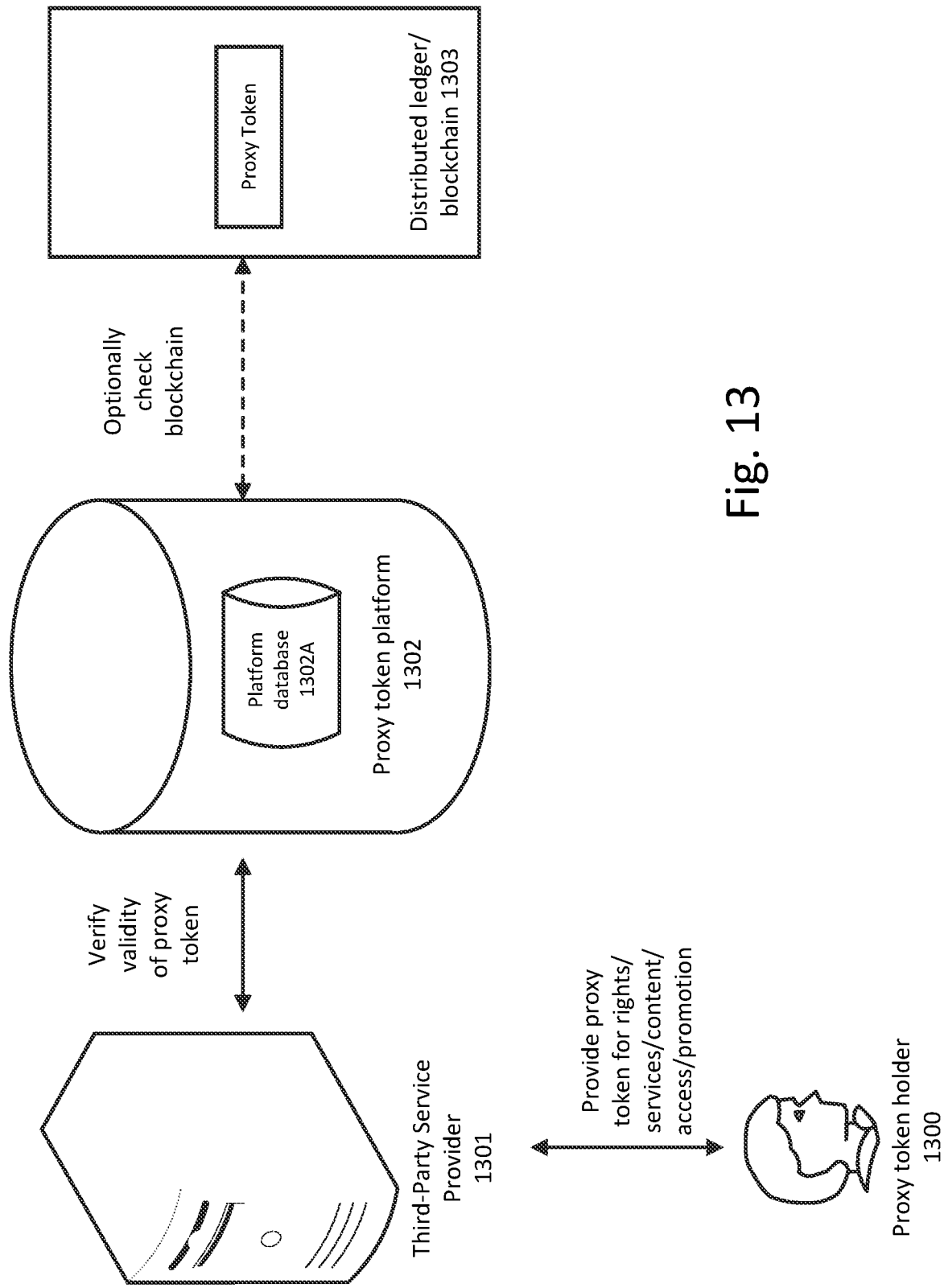
FIG. 13 illustrates an example of verifying proxy token validity according to an exemplary embodiment.

FIG. 13 illustrates an example of verifying proxy token validity according to an exemplary embodiment. The proxy token holder 1300 provides the proxy token to a third-party service provider 1301 in exchange for certain rights/services/content/access/promotions. The proxy token holder 1300 can be the entity that requested creation of the proxy token and that owns the existing (seed) token or another party that received from the proxy token from the requesting entity. The third-party service provider 1301 communicates with the proxy token platform 1302 to verify validity of the proxy token. In doing so, the third-party service provider can provide information about the proxy token, the proxy token holder, its specific services/content and any other information required to make a determination regarding validity of the proxy token. The proxy token platform 1302 can consult platform 1302A and/or optionally also check the blockchain hosting the proxy token and/or the blockchain hosting the existing (seed) token linked to the proxy token or smart contracts on either of theses blockchains.

Figure 14:
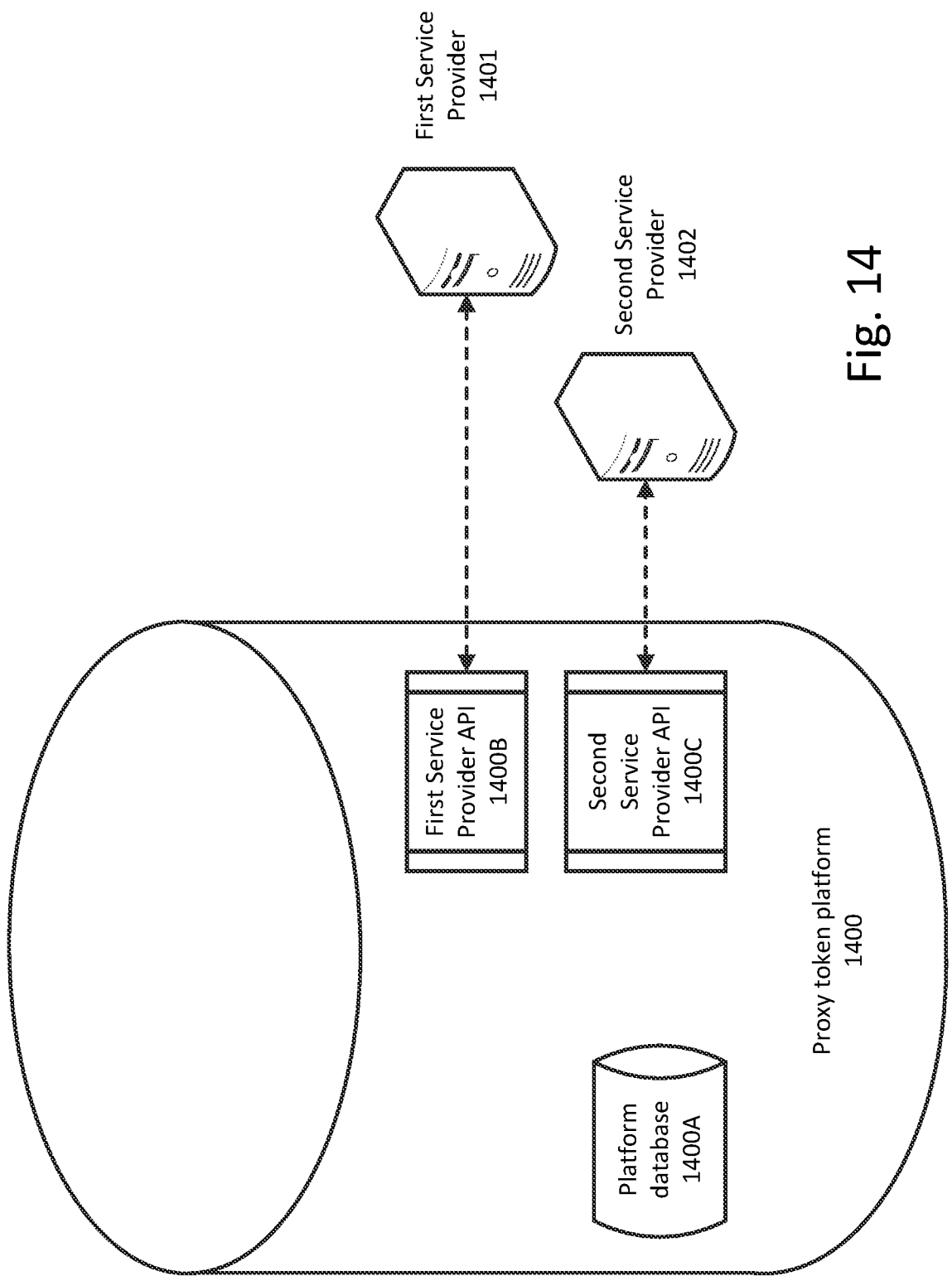
FIG. 14 illustrates an example of service providers interfacing with the proxy token platform according to an exemplary embodiment.

FIG. 14 illustrates an example of service providers interfacing with the proxy token platform according to an exemplary embodiment. As shown in FIG. 14, the proxy token platform 1400 includes a platform database 1400A including the proxy token information, including validity information, existing token linkage information, etc. The proxy token platform 1400 also includes a first service provider API 1400B for communication with a first service provider 1401 and a second service provider API 1400C for communication with a second service provider 1402. Service providers can be content providers or other types of service providers, such as merchants, vendors, libraries, streaming services, etc. Each API can be customized to the particular service provider, such that the proxy token platform can interface with different types of service providers that accept the proxy token.

Figure 15:
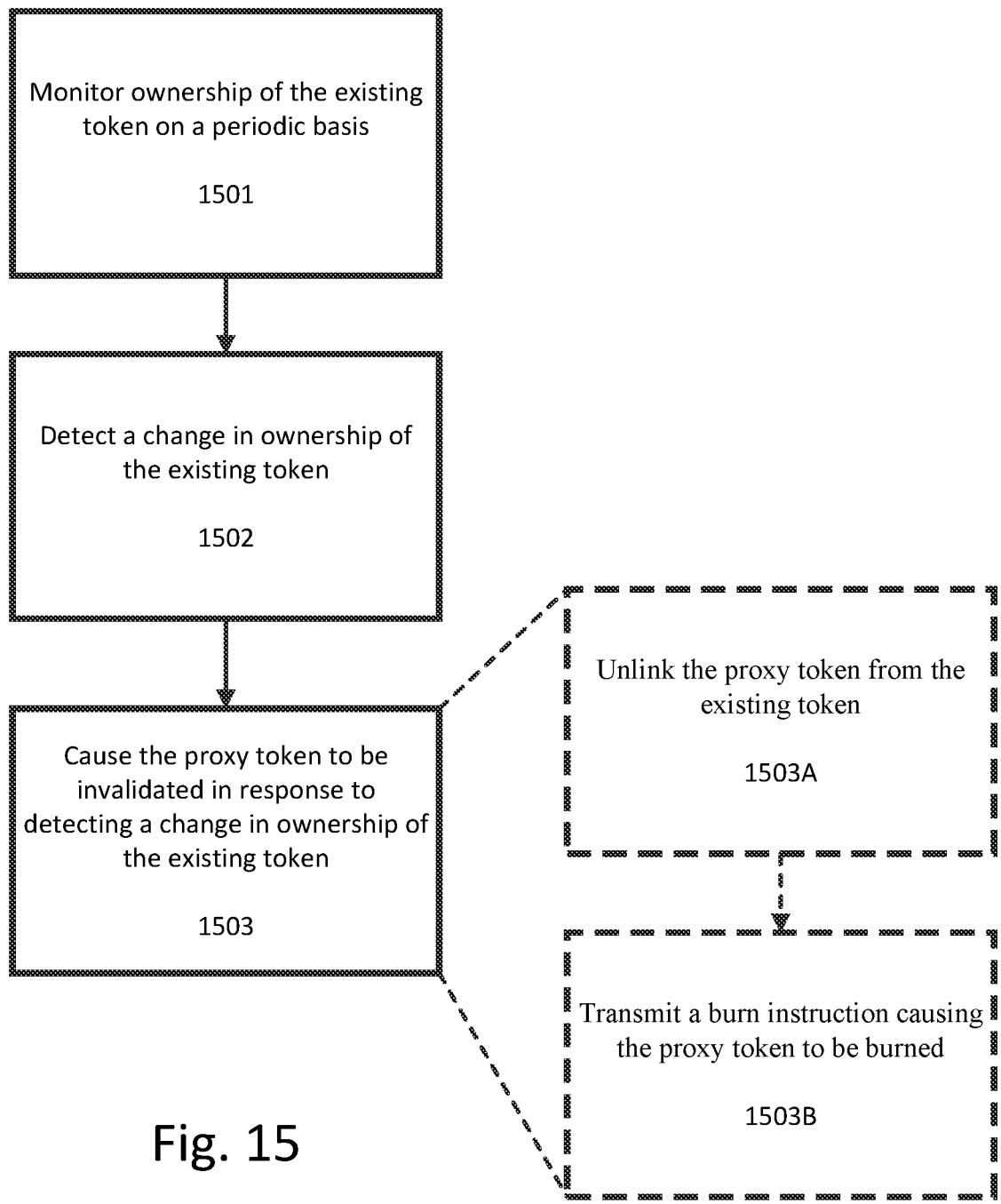
FIG. 15 illustrates a flowchart for monitoring validity of the proxy token according to an exemplary embodiment.

FIG. 15 illustrates a flowchart for monitoring validity of the proxy token according to an exemplary embodiment. Monitoring of validity can be performed on a periodic basis, according to some predetermined schedule, and/or can be set by the proxy token creator, a proxy token platform administrator, or based on some other parameter. As discussed above, validity can also be checked in response to a particular request from a service provider or an attempt to use to the proxy token.

At step 1501 ownership of the existing token is monitored on a periodic basis. For example, the validity of the of the proxy token can be monitored every 30 minutes, every hour, every 4 hours, every 8 hours, every 12 hours, every day, every week, every month, etc. Monitoring can include communicating with a smart contract on the blockchain to verify ownership of the linked existing token or reviewing metadata and ownership information directly on the blockchain to confirm/verify ownership and that ownership has not shifted since minting. The monitoring can be performed by the proxy token platform or can be automatically performed by the smart contract itself on the smart contract.

At step 1502 a change in ownership of the existing token is detected. If the monitoring is performed by a smart contract on the blockchain then the smart contract can notify the proxy token platform of the change in ownership. If the proxy token platform performs the monitoring (via communication with a smart contract and/or review of the blockchain), then the platform can identify and flag the change in ownership.

At step 1503 the proxy token is caused to be invalidated in response to detecting a change in ownership of the existing token. This invalidation can be performed by the proxy token platform and/or by the smart contract on the blockchain can include one or more steps. For example, step 1503 can include one or more of steps 1503A or 1503B.

At step 1503A the proxy token is unlinked from the existing token. If performed by a smart contract, the smart contract can send instruction to the proxy token platform instructing it to update its database to remove any association between the proxy token and the existing token and/or to mark the proxy token as invalid. If the monitoring is performed by the proxy token platform, then it can edit/revise its own database to make these changes.

At step 1503B a burn instruction is transmitted causing the proxy token to be burned. The burn instruction can be generated by the smart contract itself. Alternatively, the burn instruction can be generated by the proxy token platform and transmitted to the blockchain/smart contract. The smart contract can be configured so that the proxy token platform has permission authority to sign transactions pertaining to proxy tokens, even if the proxy tokens are created by other users (e.g. the requesting entities) that sign the creation transactions with their own wallets. In this way, the proxy token platform can act as a super user with respect to proxy tokens, signing transactions to move and/or burn proxy tokens.

It should be noted that other types of monitoring for validity can be performed by a smart contract or a proxy token platform. For example, if the proxy token has conditions pertaining to duration, uses, or other conditions, then the smart contract or the proxy token platform can communicate over the network with one or more other network sources to ensure that no invalidating conditions pertaining to the proxy token have been met and that the proxy token is still valid. If the proxy token is no longer valid, then the internal database can be updated and/or the proxy token can be burned.

Figure 16:
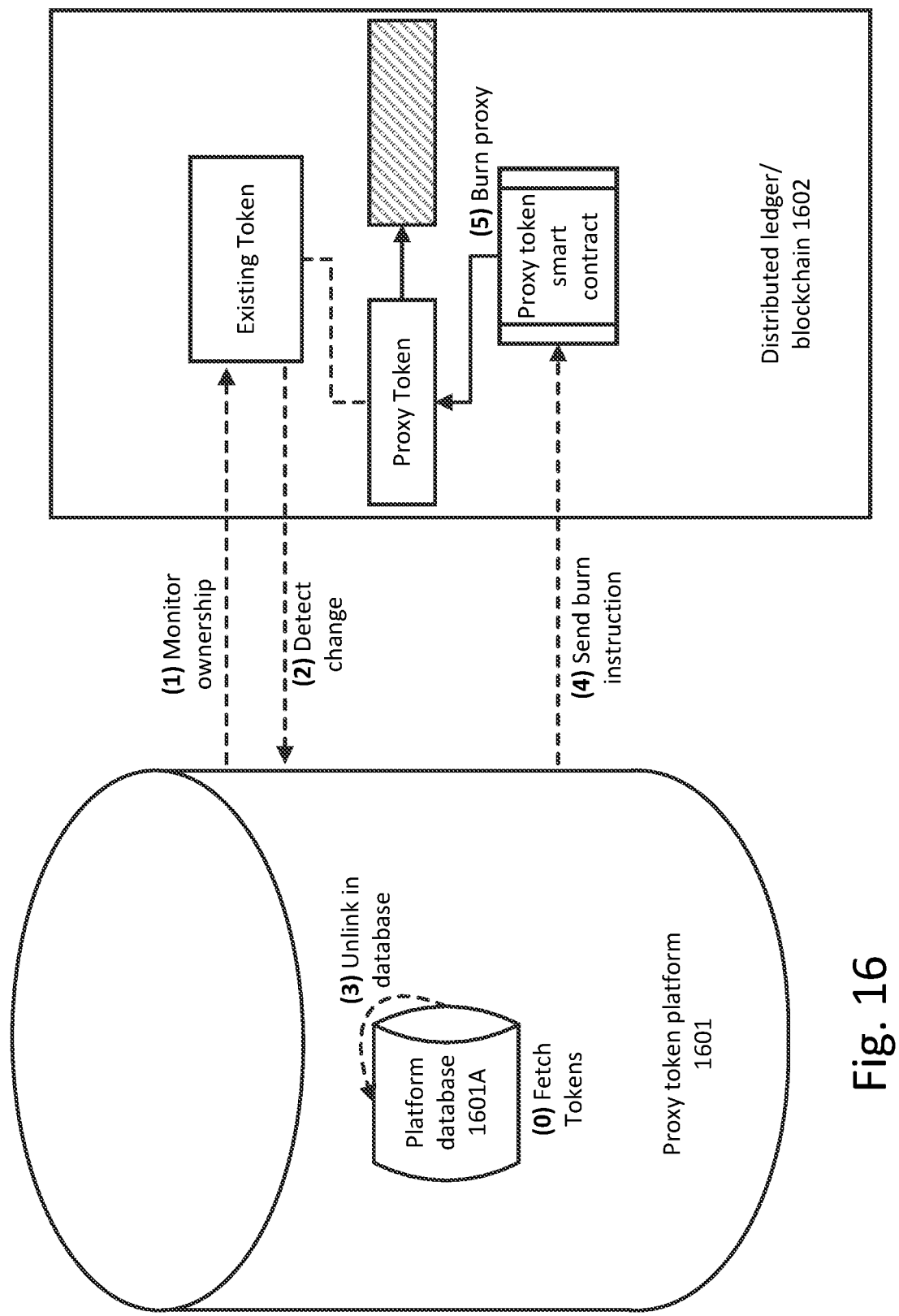
FIG. 16 illustrates an example of detecting an invalid proxy token according to an exemplary embodiment.

FIG. 16 illustrates an example of detecting an invalid proxy token according to an exemplary embodiment. The proxy token platform 1601 consults its own database 1601A to fetch current existing tokens linked to proxy tokens. The platform 1601 then communicates with the blockchain 1602 and/or a smart contract to monitor ownership of the existing tokens. When a change in ownership is detected then the platform 1601 unlinks the proxy token from the existing token in its database and marks it as invalid. The platform 1601 then sends a burn instruction to the smart contract 1602 on the blockchain, which initiates a burn of the proxy token.

Figure 17:
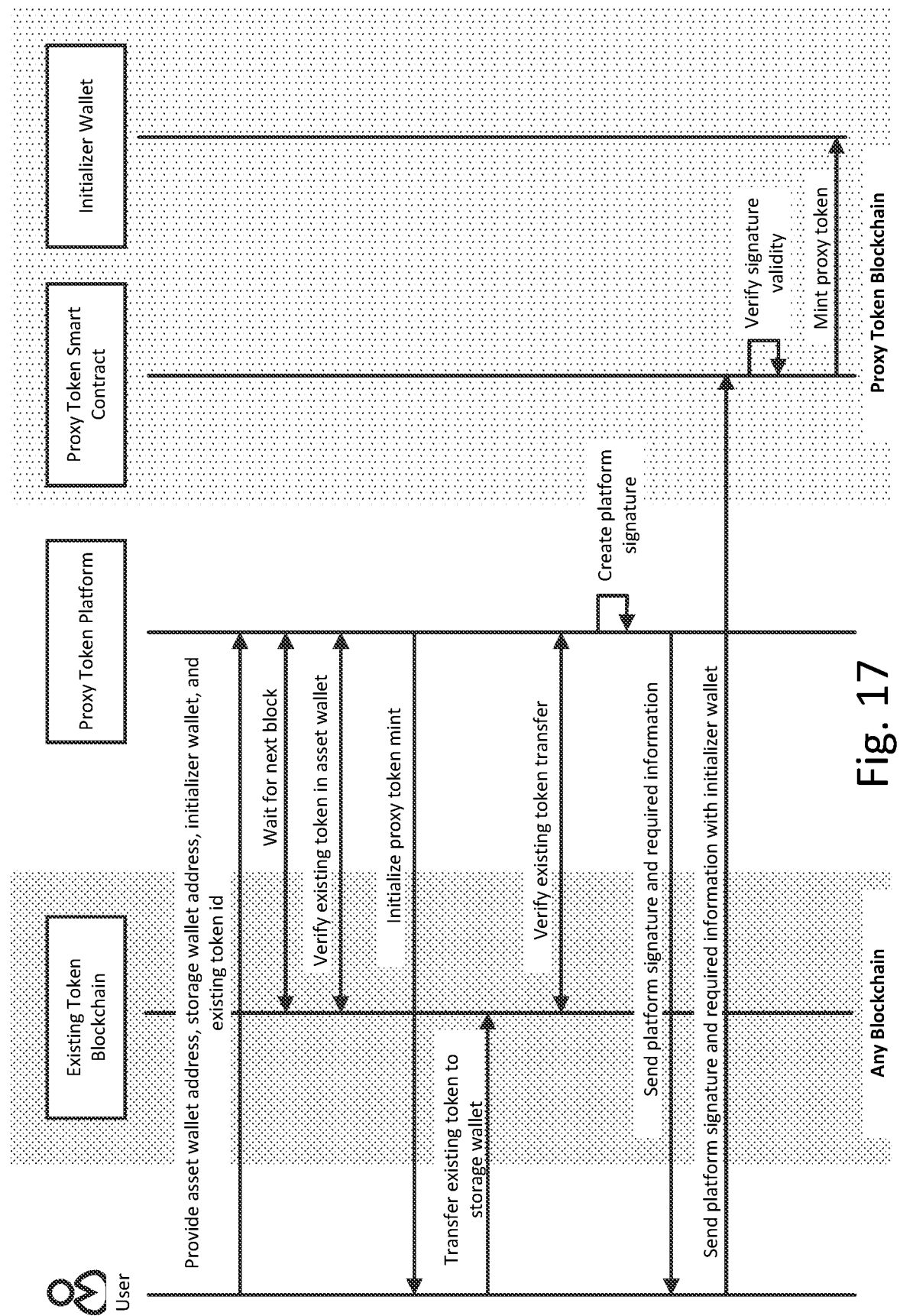
FIG. 17 illustrates a message passing diagram of proxy token generation using trustless verification according to an exemplary embodiment.

FIG. 17 illustrates a message passing diagram of proxy token generation using trustless verification according to an exemplary embodiment. The user (i.e., the entity via the entity platform) provides one or more of an asset wallet address, storage wallet address, initializer wallet, and existing token identifier to the proxy token platform. The proxy token platform waits for the next block to be issued on the existing token blockchain and then verifies that the existing token is in the asset wallet (i.e., is at the asset wallet address). The proxy token platform then sends an initialize proxy token mint message to the user. The user then transfers the existing token to the storage wallet. The proxy token platform confirms this transfer (thereby confirming ownership of the existing token/that the user controls the private key required to transfer the existing token). The proxy token platform then creates a platform signature authorizing the proxy token creation operation and sends the platform signature and any other required information to the user. The user then sends the platform signature and required information (e.g., blockchain, existing token, metadata, seed, etc.) to a proxy token smart contract on the proxy token block chain. The proxy token smart contract verifies signature validity (i.e., the platform signature) and then initiates minting of the proxy token using the initializer wallet of the user (on the proxy token blockchain). Note that the proxy token blockchain and the existing token blockchain are shown using different shading to denote that the proxy token and existing token can have different blockchains, but it is understood that the proxy token and the existing token can also be on the same blockchain.

Figure 18:
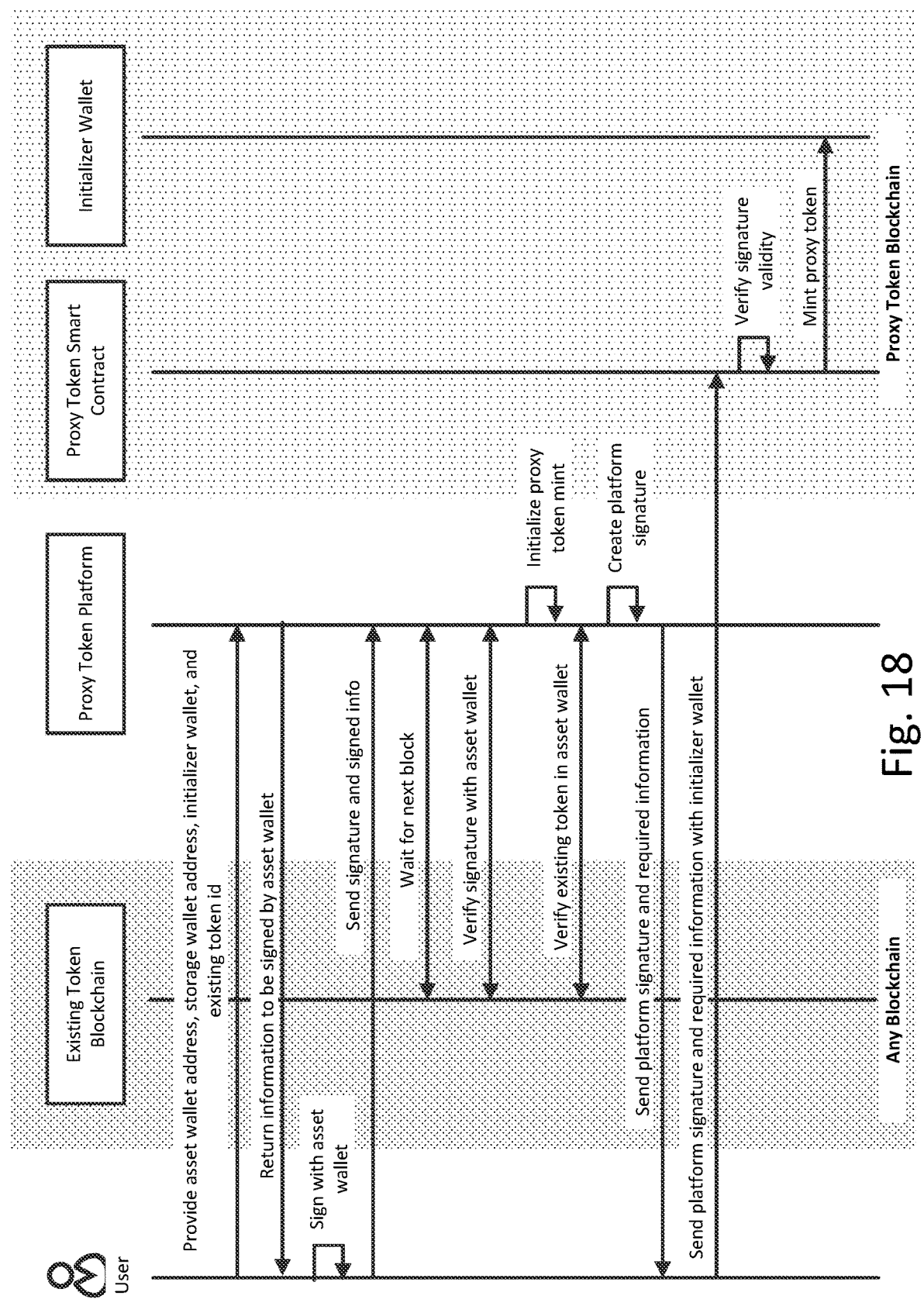
FIG. 18 illustrates a message passing diagram of proxy token generation using trusted verification according to an exemplary embodiment.

FIG. 18 illustrates a message passing diagram of proxy token generation using trusted verification according to an exemplary embodiment. The user (i.e., the entity via the entity platform) provides one or more of an asset wallet address, storage wallet address, initializer wallet, and existing token identifier to the proxy token platform. The proxy token platform returns this information to the user to be signed by the asset wallet of the user (i.e., the same wallet that holds the existing token). The user then signs this message with their asset wallet and sends the signature and signed information back to the proxy token platform. The proxy token platform waits for the next block to be issued on the existing token blockchain and then verifies the signature with the asset wallet. The proxy token platform initializes the proxy token mint and verifies that the existing token is in the asset wallet. The proxy token platform then creates a platform signature authorizing the proxy token creation operation and sends the platform signature and any other required information to the user. The user then sends the platform signature and required information (e.g., blockchain, existing token, metadata, seed, etc.) to a proxy token smart contract on the proxy token block chain. The proxy token smart contract verifies signature validity (i.e., the platform signature) and then initiates minting of the proxy token using the initializer wallet of the user (on the proxy token blockchain). Note that the proxy token blockchain and the existing token blockchain are shown using different shading to denote that the proxy token and existing token can have different blockchains, but it is understood that the proxy token and the existing token can also be on the same blockchain.

The process flows depicted in the above-mentioned figures are not intended to limit the scope of the disclosure. For example, the steps recited in any of the method or process descriptions can be executed in any order and are not limited to the order presented. It will be appreciated that the following description makes appropriate references to the various system components as described above with reference to FIG. 1 and describes additional and/or alternative aspects of the process flows.

A process flow for verifying NFT ownership and minting a proxy token in the system is now described. User 101 can via the user device 120 transmit the NFT ID, asset wallet address, storage wallet address, and NFT contract address to the proxy token smart contract. For example, the user 101 can input the data to the UI module 152 of the application platform 150 which can call the initialized proxy mint function of the proxy token smart contract 142. The proxy token smart contract 142 can verify the asset wallet's ownership of the NFT by checking if the asset wallet address is the owner of the NFT specified by the NFT ID and NFT contract address. The proxy token smart contract 142 can generate a proxy token ID and return the proxy token ID to the user device. For example, the proxy token smart contract 142 can create an entry of the asset wallet address, the storage wallet address, the NFT contract address, and the NFT ID and map this data to a unique proxy token ID. The proxy token smart contract 142 can generate the unique proxy token ID based on the NFT contract address and the NFT ID and, in this regard, the proxy token id is unique for a given NFT contract address and NFT ID.

The user can initiate the transfer of the NFT from the asset wallet to the storage wallet. For example, the blockchain wallet 124 of the user device 120 can transfer the NFT from a first blockchain transaction address associated with the wallet 124 to a second blockchain transaction address associated with the blockchain wallet 124. The user can issue a command to execute minting of the proxy token based on the NFT. For example the user device 122 can send a transaction to the proxy token smart contract 142 comprising the proxy token ID and the mint value required to mint the proxy token. The proxy token smart contract 142 can receive this data and in response verify the ownership of the NFT at the storage wallet address. For example proxy token smart contract 142 can monitor the storage wallet address (i.e., a second blockchain transaction address) for an incoming transaction and in response to detecting the incoming transaction to the second blockchain transaction address, the checks to confirm the presence of the NFT at the second blockchain transaction address. In response to verifying NFT ownership at the storage wallet, the proxy token smart contract 142 can mint the proxy token to the asset wallet. For example, the proxy token smart contract 142 can generate the proxy token associated with the NFT and store the transactable proxy token at a third blockchain transaction address associated with the first blockchain transaction address. In response to minting the proxy token, the proxy token smart contract 142 can send a mint proxy token event message to the application platform 150.

In response to receiving the mint proxy token event message, the application platform 150 can generate metadata for the proxy token. For example, the application platform 150 can execute the token metadata reader 156 and/or the proxy token metadata generator 158 to import metadata associated with the NFT and generate the proxy token metadata based on the metadata associated with the NFT. The token smart contract 142 can receive the proxy token metadata and store the proxy token metadata to the blockchain network 140 in association with the proxy token minted to the third transaction address.

The NFT can be moved from the storage wallet. For example, the user 101 can execute a transaction on the blockchain network 140 via the user device 120 to transfer the NFT from the blockchain wallet 124 to another wallet (i.e., a third party wallet). The proxy token smart contract 142 can invalidate the proxy token in response to the NFT moving from the storage wallet. For example, the proxy token smart contract 142 can continuously monitor the second blockchain transaction address for transactions and, in response to detecting a transaction transferring the NFT from the second blockchain transaction address, clear from the smart contract the metadata associated with the proxy token. The proxy token smart contract can send a token invalid message to the application platform 150 to set the proxy token validity flag associated with the related proxy token ID as invalid. The application platform can check for invalid proxy tokens and remove the associated metadata files. For example, the time-based job scheduler 153 can execute a task to periodically check the proxy token validity flag to determine whether the flag is set to invalid. In response to determining the invalid setting, the time-based job scheduler 153 can execute a task to purge the database entry associated with the proxy token from the database 154. The time-based job scheduler 153 can call the burn proxy token function to remove the proxy token data from the proxy token smart contract 142.

A proxy token metadata process flow of the system is now described. The user device 120 can call the mint proxy token function of the proxy token smart contract 142. The proxy token smart contract 142 can mint the proxy token and generate the related event message. Application platform 150 can receive the mint proxy token event message and execute the related modules and functions to create the proxy token metadata. The application platform 150 can fetch the NFT metadata. For example, the application platform 150 can execute the token metadata reader to import the metadata associated with the NFT. The application platform 150 can execute the proxy token metadata generator 158 to process the name, description, external_url, and image metadata elements of the NFT and thereby generate the proxy token metadata. In response to processing the image metadata, the application platform 150 can upload the watermarked image to the database 154. The application platform 150 can call the proxy token metadata generator 158 to update the image link in the proxy token metadata to the URL for the uploaded watermarked image. The application platform 150 can create a new entry in database 154 for the newly minted proxy token. The application platform 150 can upload the generated proxy token metadata to a predefined link or URL accessible via the web. The user device 120 can call the get token URI function of the proxy token smart contract 142. The proxy token smart contract 142 can fetch the proxy token metadata and the associated image from the database 154 using the proxy token URI.

A data clean up process flow of the system is now described. The time-based job scheduler 153 of application platform 150 can periodically check for proxy token validity. The application platform 150 can fetch a list of all active proxy tokens from the database 154. The application platform 150 can call the proxy token smart contract 142 to determine whether each active proxy token from the database list is valid. For example, the time-based job scheduler 153 can periodically call the get proxy token URI function of the proxy token smart contact 142. In response to a return from the proxy token smart contract 142 indicating an invalid proxy token, the application platform 150 removes the associated data and metadata from the database 154. The application platform 150 can call the proxy token smart contract 142 to remove the proxy token data from the proxy token smart contract 142. For example, the time-based job scheduler 153 can call the burn proxy token function of the proxy token smart contract 142 and pass the proxy token ID for the invalid proxy token. In response to receiving a burn proxy token success message from the proxy token smart contract 142, the application platform 150 can update the database status 150 to reflect the proxy token as having been removed.

A user journey process flow of the system 100 is now described. Via the user device 120, user 101 connects their blockchain wallet 124 to the application platform 150. The UI module 152 can display the blockchain wallet connection page and provide prompts to effect connection of the blockchain wallet 124. The user enters their asset wallet blockchain address into the application platform 150. The application platform 150 can prompt the user 101 to enter their asset wallet address via the UI module 152 through the asset wallet address input page. The application platform fetches all of the NFTs owned by the user and populates the NFT selection page of the UI module 152. For example, the application platform 150 can receive the asset wallet address via the UI module 152 and, in response execute the token metadata reader 156. The token metadata reader 156 can call the NFT smart contract 134 and/or NFT issuer system 130 to extract all the NFT data associated with the blockchain wallet 124. The UI module 142 can populate the NFT selection page with the NFT metadata such as, for example, NFT name, an image of the NFT, the NFT ID, and or the like. Where multiple NFTs are associated with the blockchain wallet 124, the NFT selection page can display a grid and/or rows of the NFTs image metadata. The images can be interactable to enable user selection of the desired NFT to be further processed by the system to generate a proxy token. The user can select a desired NFT for further processing by the system to generate a proxy token. The system can receive the NFT selection from the user and progress to the next block in the process.

In response to receiving the NFT selection from the user, the application platform 150 checks if a proxy token has been initialized for minting from the selected NFT. For example, the application platform 150 can call the proxy token smart contract 142 with the fetch initialized proxy token mints function and pass the NFT contract addresses and NFT ID associated with the user selected NFT. The proxy token smart contract 142 can return a proxy token ID and progress to display the selection verification page. The selection verification page can prompt the user with several options to: 1) select from the previously entered asset wallet and storage wallet address combination to perform minting; 2) re-initialize the process with a new pair of asset wallet and storage wallet addresses; or 3) cancel the proxy token minting process. In response to receiving the user selection of option 2 described above, the platform starts a new initialize proxy token mint process. The user can select option 1 as described above, and the system can receive the selection.

The system can verify that the selected NFT has been transferred to the storage wallet. For example, the application platform 150 can execute the token metadata reader to import the current owner of the NFT. The application platform 150 can compare the current owner to the storage wallet address to determine that the storage wallet address is the current owner. In response to determining the NFT is transferred to the storage wallet, the application platform 150 can display a NFT ownership verification confirmation page via the UI module 152. The NFT ownership confirmation page can include a user interactable 'mint proxy token' button. The user can interact with the mint proxy token button and thereby receive a command to mint the proxy token from the selected NFT. In response to receiving the user interaction with the mint proxy token button, the application platform 150 can call the proxy token smart contract 142 with the mint proxy token function and pass the proxy token ID for minting. The user pays the mint cost via the blockchain wallet 124 and signs the minting transaction generated via the proxy token smart contract 142. In response to successfully generating the proxy token, the proxy token smart contract 142 emits the mint proxy token event message. The application platform 150 receives the mint proxy token event message and executes the UI module to display the minting confirmation page and/or a final success page. The minting process can fail and the proxy token smart contract 142 can generate a minting transaction failure message. The application platform 150 can receive the minting transaction failure message and execute the UI module to display a minting error page.

In response to determining that the selected NFT is not initialized for minting, the system can prompt the user to enter the storage wallet address. For example, the UI module 152 can display the storage wallet address input page. In response to receiving the storage wallet address, the application platform can call the initialized proxy token mint function of the proxy token smart contract 142. The application platform 150 can pass the asset wallet address, the storage wallet address, the NFT contract address, and the NFT ID to the proxy token smart contract 142 and the user can sign the transaction via the blockchain wallet 124. Where the initialization transaction fails, the proxy token smart contract 142 can emit an initialization failure message. The application platform 150 can receive the initialization failure message and display an error page. In response to successfully completing the initialization process, the proxy token smart contract 142 returns the unique proxy token ID. In response to receiving the proxy token ID, the application platform 150 executes the UI module to display the NFT transfer instruction page and prompt the user to execute the transfer of the NFT from the asset wallet to the storage wallet. The user can transfer the NFT from the asset wallet to the storage wallet via the blockchain wallet 154. The NFT transfer instruction page can display a user interactable transfer confirmation button and the application platform 150 can receive an interaction with the transfer confirmation button. In response to receiving the interaction with the transfer confirmation button, the process can progress to block 5018. In response to determining that the NFT has not transferred to the storage wallet, the process can return the user to the NFT transfer instruction screen.

The disclosure includes specific rules for implementing the outcome of a blockchain based proxy token transaction system and that render information into a specific format that is then used and applied to create the desired results of a blockchain based proxy token transaction system. In other words, the outcome of a blockchain based proxy token transaction system can be performed by many different types of rules and combinations of rules, and this disclosure includes specific rules.

Figure 19:
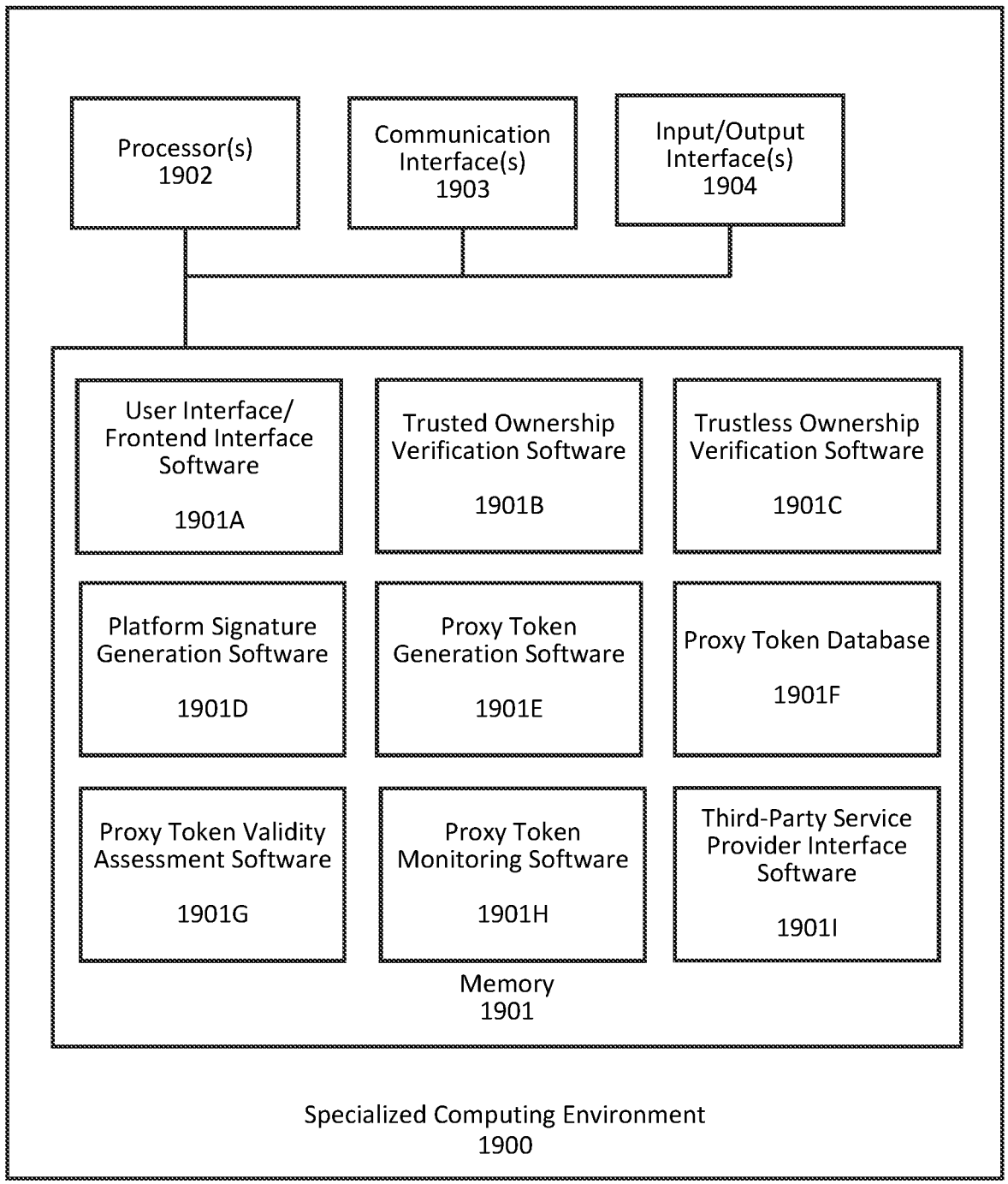
FIG. 19 illustrates a specialized computing environment of the proxy token platform according to an exemplary embodiment.

FIG. 19 illustrates a specialized computing environment 1900 of the proxy token platform and configured to perform the processes described herein according to an exemplary embodiment.

Specialized computing environment 1900 is a computing device that includes a memory 1901 that is a non-transitory computer-readable medium and can be volatile memory (e.g., registers, cache, RAM), non-volatile memory (e.g., ROM, EEPROM, flash memory, etc.), or some combination of the two.

As shown in FIG. 19, memory 1901 can store user interface/frontend interface software 1901A, trusted ownership verification software 1901B, trustless ownership verification software 1901C, platform signature generation software 1901D, proxy token generation software 1901E, proxy token database 1901F, proxy token validity assessment software 1901G, proxy token monitoring software 1901H, third-party service provider interface software 1901I. Each of the software components in memory 1901 store specialized instructions and data structures configured to perform the corresponding functionality and techniques described herein.

All of the software stored within memory 1901 can be stored as a computer-readable instructions, that when executed by one or more processors 1902, cause the processors to perform the functionality described with respect to FIGS. 1-18 and/or described above.

Processor(s) 1902 execute computer-executable instructions and can be a real or virtual processors. In a multi-processing system, multiple processors or multicore processors can be used to execute computer-executable instructions to increase processing power and/or to execute certain software in parallel.

Specialized computing environment 1900 additionally includes a communication interface 1903, such as a network interface, which is used to communicate with devices, applications, or processes on a computer network or computing system, collect data from devices on a network, and implement encryption/decryption actions on network communications within the computer network or on data stored in databases of the computer network. The communication interface conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Specialized computing environment 1900 further includes input and output interfaces 1904 that allow users (such as system administrators) to provide input to the system to display information, to edit data stored in memory 1901, or to perform other administrative functions.

An interconnection mechanism (shown as a solid line in FIG. 19), such as a bus, controller, or network interconnects the components of the specialized computing environment 1900.

Input and output interfaces 1904 can be coupled to input and output devices. For example, Universal Serial Bus (USB) ports can allow for the connection of a keyboard, mouse, pen, trackball, touch screen, or game controller, a voice input device, a scanning device, a digital camera, remote control, or another device that provides input to the specialized computing environment 1900.

Specialized computing environment 1900 can additionally utilize a removable or non-removable storage, such as magnetic disks, magnetic tapes or cassettes, CD-ROMs, CD-RWs, DVDs, USB drives, or any other medium which can be used to store information and which can be accessed within the specialized computing environment 800.

The system and platform can include remote access to data, standardizing data and allowing remote users to share information in real time. The system can allow users to access data (e.g., NFT data, proxy data, etc), and receive updated data in real time from other users. The system can store the data (e.g., in a standardized format) in a plurality of storage devices, provide remote access over a network so that users can update the data that was in a non-standardized format (e.g., dependent on the hardware and software platform used by the user) in real time through a GUI, convert the updated data that was input (e.g., by a user) in a non-standardized form to the standardized format, automatically generate a message (e.g., containing the updated data) whenever the updated data is stored and transmit the message to the users over a computer network in real time, so that the user has immediate access to the up-to-date data. The system allows remote users to share data in real time in a standardized format, regardless of the format (e.g. non-standardized) that the information was input by the user.

The system can train a model, obtain results, then use the results to enhance the model. The system can use an expanded data set of past data to train the neural network. The expanded training set can be developed by applying mathematical algorithms to the acquired set of data. The neural network is then trained with the expanded data set using a machine learning algorithm that uses a mathematical function to adjust certain weighting. The system can also use an iterative training algorithm to re-train with additional data. The system can also include the practical application of using machine learning with historical data to predict an outcome based on characteristics of the data.

The system can also include a filtering tool that is remote from the end user and provides customizable filtering features to each end user. The filtering tool can provide customizable filtering by filtering access to the data. The filtering tool can identify data or accounts that communicate with the server and can associate a request for content with the individual account. The system can include a filter on a local computer and a filter on a server. The filtering tool can identify information or accounts that communicate with the server, and associate a request for content with the individual account. The system can include a filter on a local computer and a filter on a server.

Any communication, transmission, and/or channel discussed herein can include any system or method for delivering content (e.g. data, information, metadata, etc.), and/or the content itself. The content can be presented in any form or medium, and the content can be delivered electronically and/or capable of being presented electronically. For example, a channel can comprise a website, mobile application, or device (e.g., FACEBOOK®, YOUTUBE®, PANDORA®, APPLE TV®, MICROSOFT® XBOX®, ROKU®, AMAZON FIRE®, GOOGLE CHROMECAST™, SONY® PLAYSTATION®, NINTENDO® SWITCH®, etc.) a uniform resource locator ("URL"), a document (e.g., a MICROSOFT® Word or EXCEL™, an ADOBE® Portable Document Format (PDF) document, etc.), an "ebook," an "emagazine," an application or microapplication (as described herein), an short message service (SMS) or other type of text message, an email, a FACEBOOK® message, a TWITTER® tweet, multimedia messaging services (MMS), and/or other type of communication technology. A channel can be hosted or provided by a data partner. The distribution channel can comprise at least one of a merchant website, a social media website, affiliate or partner websites, an external vendor, a mobile device communication, social media network, and/or location based service. Distribution channels can include at least one of a merchant website, a social media site, affiliate or partner websites, an external vendor, and a mobile device communication. Examples of social media sites include FACEBOOK®, FOURSQUARE®, TWITTER®, LINKEDIN®, INSTAGRAM®, PINTEREST®, TUMBLR®, REDDIT®, SNAPCHAT®, WHATSAPP®, FLICKR®, VK®, QZONE®, WECHAT®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

The various communications discussed herein can be performed using a network. As used herein, the term "network" can further include any cloud, cloud computing system or electronic communications system or method that incorporates hardware and/or software components. Communication among the parties can be accomplished through any suitable communication channels, such as, for example, a telephone network, an extranet, an intranet, Internet, point of interaction device (point of sale device, personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system can also be implemented using IPX, AppleTalk, IP-6, NetBIOS, OSI, any tunneling protocol (e.g., IPsec, SSH, etc.), or any number of existing or future protocols. If the network is in the nature of a public network, such as the Internet, it can be advantageous to presume the network to be insecure and open to eavesdroppers.

A network can be unsecure. Thus, communication over the network can utilize data encryption. Encryption can be performed by way of any of the techniques now available in the art or which can become available—e.g., Twofish, RSA, El Gamal, Schorr signature, DSA, PGP, PKI, GPG (GnuPG), and symmetric and asymmetric cryptosystems. Asymmetric encryption in particular can be of use in signing and verifying signatures for blockchain crypto operations.

The methods described herein are implemented using the various particular machines described herein. The methods described herein can be implemented using the below particular machines, and those hereinafter developed, in any suitable combination, as would be appreciated immediately by one skilled in the art. Further, as is unambiguous from this disclosure, the methods described herein can result in various transformations of certain articles.

Furthermore, the connecting lines shown in the various figures contained herein are intended to represent exemplary functional relationships and/or physical couplings between the various elements. It should be noted that many alternative or additional functional relationships or physical connections can be present in a practical system.

The various system components discussed herein can include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases.

The present system or any part(s) or function(s) thereof can be implemented using hardware, software or a combination thereof and can be implemented in one or more specialized computer systems or specialized other processing systems.

The present system is directed toward one or more computer systems capable of carrying out the functionality described herein. The computer system includes one or more processors, such as processor. The processor is connected to a communication infrastructure (e.g., a communications bus, cross-over bar, or network). Computer system can include a display interface that forwards graphics, text, and other data from the communication infrastructure (or from a frame buffer not shown) for display on a display unit The server can include application servers (e.g. WEB SPHERE, WEB LOGIC, JBOSS, EDB® Postgres Plus Advanced Server® (PPAS), etc.). The server can include web servers (e.g. APACHE, IIS, GWS, SUN JAVA® SYSTEM WEB SERVER, JAVA Virtual Machine running on LINUX or WINDOWS).

A web client includes any device (e.g., personal computer) which communicates via any network, for example such as those discussed herein. Such browser applications comprise Internet browsing software installed within a computing unit or a system to conduct online transactions and/or communications. These computing units or systems can take the form of a computer or set of computers, although other types of computing units or systems can be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client can run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client can or can not be in direct contact with an application server. For example, a web client can access the services of an application server through another server and/or hardware component, which can have a direct or indirect connection to an Internet server. For example, a web client can communicate with an application server via a load balancer. Access is through a network or the Internet through a commercially-available web-browser software package.

As those skilled in the art will appreciate, a web client includes an operating system (e.g., WINDOWS®/CE/Mobile, OS2, UNIX®, LINUX®, SOLARIS®, MacOS, etc.) as well as various support software and drivers. A web client can include any suitable personal computer, network computer, workstation, personal digital assistant, cellular phone, smart phone, minicomputer, mainframe or the like. A web client can be in a home or business environment with access to a network. Access is through a network or the Internet through a commercially available web-browser software package. A web client can implement security protocols such as Secure Sockets Layer (SSL) and Transport Layer Security (TLS). A web client can implement several application layer protocols including http, https, ftp, and sftp.

Components, modules, and/or engines of system 100 can be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app can be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app can leverage the communication protocol of the operating system and associated device hardware under the predetermined rules of the mobile operating system. Moreover, where the micro-app desires an input from a user, the micro-app can be configured to request a response from the operating system which monitors various hardware components and then communicates a detected input from the hardware to the micro-app.

The various system components can be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., Gilbert Held, Understanding Data Communications (1996), which is hereby incorporated by reference. It is noted that the network can be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing can include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited March 1223), which is hereby incorporated by reference in its entirety.

As used herein, "transmit" can include sending electronic data from one system component to another over a network connection. Additionally, as used herein, "data" can include encompassing information such as commands, queries, files, data for storage, and the like in digital or any other form.

Any databases discussed herein can include relational, hierarchical, graphical, blockchain, object-oriented structure and/or any other database configurations. Common database products that can be used to implement the databases include DB2 by IBM® (Armonk, NY), various database products available from ORACLE® Corporation (Redwood Shores, CA), MICROSOFT® Access® or MICROSOFT® SQL Server® by MICROSOFT® Corporation (Redmond, Washington), MySQL by MySQL AB (Uppsala, Sweden), MongoDB®, Redis®, Apache Cassandra®, HBase by APACHE®, MapR-DB, or any other suitable database product. Moreover, the databases can be organized in any suitable manner, for example, as data tables or lookup tables. Each record can be a single file, a series of files, a linked series of data fields or any other data structure.

Association of certain data can be accomplished through any desired data association technique such as those known or practiced in the art. For example, the association can be accomplished either manually or automatically. Automatic association techniques can include, for example, a database search, a database merge, GREP, AGREP, SQL, using a key field in the tables to speed searches, sequential searches through all the tables and files, sorting records in the file according to a known order to simplify lookup, and/or the like. The association step can be accomplished by a database merge function, for example, using a "key field" in pre-selected databases or data sectors. Various database tuning steps are contemplated to optimize database performance. For example, frequently used files such as indexes can be placed on separate file systems to reduce In/Out ("I/O") bottlenecks.

More particularly, a "key field" partitions the database according to the high-level class of objects defined by the key field. For example, certain types of data can be designated as a key field in a plurality of related data tables and the data tables can then be linked on the basis of the type of data in the key field. The data corresponding to the key field in each of the linked data tables is preferably the same or of the same type. However, data tables having similar, though not identical, data in the key fields can also be linked by using AGREP, for example. Any suitable data storage technique can be utilized to store data without a standard format. Data sets can be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that can include fractal compression methods, image compression methods, etc.

Any of the communications, inputs, storage, databases or displays discussed herein can be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server can include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art and are covered in many standard texts. See, e.g., ALEX NGHIEM, IT WEB SERVICES: A ROADMAP FOR THE ENTERPRISE (1203), hereby incorporated by reference. For example, representational state transfer (REST), or RESTful, web services can provide one way of enabling interoperability between applications.

Middleware can include any hardware and/or software suitably configured to facilitate communications and/or process transactions between disparate computing systems. Middleware components are commercially available and known in the art. Middleware can be implemented through commercially available hardware and/or software, through custom hardware and/or software components, or through a combination thereof. Middleware can reside in a variety of configurations and can exist as a standalone system or can be a software component residing on the Internet server. Middleware can be configured to process transactions between the various components of an application server and any number of internal or external systems for any of the purposes disclosed herein. WEBSPHERE MQ™ (formerly MQSeries) by IBM®, Inc. (Armonk, NY) is an example of a commercially available middleware product. An Enterprise Service Bus ("ESB") application is another example of middleware.

Practitioners will also appreciate that there are a number of methods for displaying data within a browser-based document. Data can be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method can be described herein in terms of functional block components, screen shots, optional selections and various processing steps. It should be appreciated that such functional blocks can be realized by any number of hardware and/or software components configured to perform the specified functions. For example, the system can employ various integrated circuit components, e.g., memory elements, processing elements, logic elements, look-up tables, and the like, which can carry out a variety of functions under the control of one or more microprocessors or other control devices. Similarly, the software elements of the system can be implemented with any programming or scripting language such as C, C++, C#, JAVA®, JAVASCRIPT, JAVASCRIPT Object Notation (JSON), VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

Benefits, other advantages, and solutions to problems have been described. However, the benefits, advantages, solutions to problems, and any elements that can cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone can be present, B alone can be present, C alone can be present, or that any combination of the elements A, B and C can be present; for example, A and B, A and C, B and C, or A and B and C. Although the disclosure includes a method, it is contemplated that it can be embodied as computer program instructions on a tangible computer-readable carrier, such as a magnetic or optical memory or a magnetic or optical disk. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but can include other elements not expressly listed or inherent to such process, method, article, or apparatus.

The invention claimed is:

1. A method executed by one or more computing devices of a proxy token platform on a computer network for generating a proxy token linked to an existing token without exposing a private key of an existing token owner to the proxy token platform, the method comprising:

receiving a proxy token initiation message from an entity on the computer network, the proxy token initiation message referencing an existing token stored on a distributed storage system via a public wallet address of an asset wallet;

determining that the entity controls a private key corresponding to the asset wallet based at least in part on detecting transfer of the existing token from the asset wallet to a predetermined storage address known to the proxy token platform prior to initiation of the transfer;

generating a platform signature based at least in part on a determination that the entity controls a private key corresponding to the asset wallet; and transmitting a proxy token generation message, the proxy token generation message comprising the platform signature, wherein the proxy token is generated based at least in part on the transmission of the proxy token generation message and the platform signature, wherein the minting transaction to generate the proxy token is signed with an initializer wallet of the entity, and wherein the proxy token is linked in a memory to the existing token;

wherein the platform is configured to verify validity of the proxy token based at least in part on one or more of: ownership of the existing token or a current linkage of the proxy token to the existing token.

2. The method of claim 1, further comprising:

receiving a request to verify validity of the proxy token;

determining whether the entity is currently the owner of the existing token;

determining whether the proxy token is currently linked to the existing token; and transmitting a verification message verifying validity of the proxy token based at least in part on a determination that the entity is currently the owner of the existing token and a determination that the proxy token is currently linked to the existing token.

3. The method of claim 1, further comprising:
monitoring ownership of the existing token on a periodic basis;
detecting a change in ownership of the existing token; and
causing the proxy token to be invalidated in response to detecting a change in ownership of the existing token.

4. The method of claim 3, wherein causing the proxy token to be invalidated comprises one or more of:
unlinking the proxy token from the existing token; or
transmitting a burn instruction causing the proxy token to be burned.

5. The method of claim 1, wherein the existing token is stored on a first blockchain and wherein the proxy token is stored on a second blockchain distinct from the first blockchain.

6. The method of claim 1, wherein determining that the entity controls a private key corresponding to the asset wallet based at least in part on detecting transfer of the existing token from the asset wallet to a predetermined storage address known to the proxy token platform prior to initiation of the transfer comprises:
receiving a storage wallet address corresponding to a storage wallet that is distinct from an asset wallet storing the existing token;
detecting transfer of the existing token from the asset wallet to the storage wallet based at least in part on the storage wallet address; and
determining that the entity controls the private key required to transfer the existing token to a different location on the distributed storage system based at least in part on detecting transfer of the existing token from an asset wallet to the storage wallet address.

7. The method of claim 6, wherein the storage wallet comprises a cold wallet.

8. The method of claim 1, wherein the proxy token is generated by:
generating a minting transaction for the proxy token;
signing the minting transaction using a private key of the initializer wallet associated with the entity; and
executing the minting transaction to generate the proxy token.

9. The method of claim 8, wherein the minting transaction takes as input the platform signature and one or more of: an identifier of the existing token, an asset wallet address of an asset wallet, a storage wallet address corresponding to a storage wallet, or an initializer wallet address of the initializer wallet.

10. The method of claim 8, wherein the initializer wallet comprises an asset wallet of the entity.

11. The method of claim 1, wherein the proxy token is linked to the existing token in metadata associated with the proxy token on a blockchain.

12. The method of claim 1, wherein the proxy token is linked to the existing token in a database external to a blockchain storing the proxy token and wherein the platform signature is stored in the database external to the blockchain storing the proxy token.

13. A proxy token platform apparatus on a computer network for generating a proxy token linked to an existing token without exposing a private key of an existing token owner to the proxy token platform, the proxy token platform apparatus comprising:
one or more processors; and
one or more memories operatively coupled to at least one of the one or more processors and having instructions stored thereon that, when executed by at least one of the one or more processors, cause at least one of the one or more processors to:
receive a proxy token initiation message from an entity on the computer network, the proxy token initiation message referencing an existing token stored on a distributed storage system via a public wallet address of an asset wallet;
determine that the entity controls a private key corresponding to the asset wallet based at least in part on detecting transfer of the existing token from the asset wallet to a predetermined storage address known to the proxy token platform prior to initiation of the transfer;
generate a platform signature based at least in part on a determination that the entity controls a private key corresponding to the asset wallet; and
transmit a proxy token generation message, the proxy token generation message comprising the platform signature, wherein the proxy token is generated based at least in part on the transmission of the proxy token generation message and the platform signature, wherein the minting transaction to generate the proxy token is signed with an initializer wallet of the entity, and wherein the proxy token is linked in a memory to the existing token;
wherein the platform is configured to verify validity of the proxy token based at least in part on one or more of: ownership of the existing token or a current linkage of the proxy token to the existing token.

14. The proxy token platform apparatus of claim 13, wherein at least one of the one or more memories has further instructions stored thereon that, when executed by at least one of the one or more processors, cause at least one of the one or more processors to:
receive a request to verify validity of the proxy token;
determine whether the entity is currently the owner of the existing token;
determine whether the proxy token is currently linked to the existing token; and
transmit a verification message verifying validity of the proxy token based at least in part on a determination that the entity is currently the owner of the existing token and a determination that the proxy token is currently linked to the existing token.

15. The proxy token platform apparatus of claim 13, wherein at least one of the one or more memories has further instructions stored thereon that, when executed by at least one of the one or more processors, cause at least one of the one or more processors to:
monitor ownership of the existing token on a periodic basis;
detect a change in ownership of the existing token; and
cause the proxy token to be invalidated in response to detecting a change in ownership of the existing token.

16. The proxy token platform apparatus of claim 15, wherein the instructions that, when executed by at least one of the one or more processors, cause at least one of the one or more processors to cause the proxy token to be invalidated further cause at least one of the one or more processors to perform one or more of:
unlinking the proxy token from the existing token; or
transmitting a burn instruction causing the proxy token to be burned.

17. The proxy token platform apparatus of claim 13, wherein the instructions that, when executed by at least one of the one or more processors, cause at least one of the one or more processors to determine that the entity controls a private key corresponding to the asset wallet based at least in part on detecting transfer of the existing token from the asset wallet to a predetermined storage address known to the proxy token platform prior to initiation of the transfer further cause at least one of the one or more processors to:
receive a storage wallet address corresponding to a storage wallet that is distinct from an asset wallet storing the existing token;
detect transfer of the existing token from the asset wallet to the storage wallet based at least in part on the storage wallet address; and
determine that the entity controls the private key required to transfer the existing token to a different location on the distributed storage system based at least in part on detecting transfer of the existing token from an asset wallet to the storage wallet address.

18. The proxy token platform apparatus of claim 13, wherein the proxy token is generated by:
generating a minting transaction for the proxy token;
signing the minting transaction using a private key of the initializer wallet associated with the entity; and
executing the minting transaction to generate the proxy token.

19. At least one non-transitory computer-readable medium storing computer-readable instructions for generating a proxy token linked to an existing token without exposing a private key of an existing token owner to the proxy token platform that, when executed by one or more computing devices of a proxy token platform on a computer network, cause at least one of the one or more computing devices to:
receive a proxy token initiation message from an entity on the computer network, the proxy token initiation message referencing an existing token stored on a distributed storage system via a public wallet address of an asset wallet;
determine that the entity controls a private key corresponding to the asset wallet based at least in part on detecting transfer of the existing token from the asset wallet to a predetermined storage address known to the proxy token platform prior to initiation of the transfer;
generate a platform signature based at least in part on a determination that the entity controls a private key corresponding to the asset wallet; and
transmit a proxy token generation message, the proxy token generation message comprising the platform signature, wherein the proxy token is generated based at least in part on the transmission of the proxy token generation message and the platform signature, wherein the minting transaction to generate the proxy token is signed with an initializer wallet of the entity, and wherein the proxy token is linked in a memory to the existing token;
wherein the platform is configured to verify validity of the proxy token based at least in part on one or more of: ownership of the existing token or a current linkage of the proxy token to the existing token.

20. The at least one non-transitory computer-readable medium of claim 19, further storing computer-readable instructions that, when executed by at least one of the one or more computing devices, cause at least one of the one or more computing devices to:
receive a request to verify validity of the proxy token;
determine whether the entity is currently the owner of the existing token;
determine whether the proxy token is currently linked to the existing token; and
transmit a verification message verifying validity of the proxy token based at least in part on a determination that the entity is currently the owner of the existing token and a determination that the proxy token is currently linked to the existing token.

21. The at least one non-transitory computer-readable medium of claim 19, further storing computer-readable instructions that, when executed by at least one of the one or more computing devices, cause at least one of the one or more computing devices to:
monitor ownership of the existing token on a periodic basis;
detect a change in ownership of the existing token; and
cause the proxy token to be invalidated in response to detecting a change in ownership of the existing token.

22. The at least one non-transitory computer-readable medium of claim 21, wherein the instructions that, when executed by at least one of the one or more computing devices, cause at least one of the one or more computing devices to cause the proxy token to be invalidated further cause at least one of the one or more computing devices to perform one or more of:
unlinking the proxy token from the existing token; or
transmitting a burn instruction causing the proxy token to be burned.

23. The at least one non-transitory computer-readable medium of claim 19, wherein the instructions that, when executed by at least one of the one or more computing devices, cause at least one of the one or more computing devices to determine that the entity controls a private key corresponding to the asset wallet based at least in part on detecting transfer of the existing token from the asset wallet to a predetermined storage address known to the proxy token platform prior to initiation of the transfer further cause at least one of the one or more computing devices to:
receive a storage wallet address corresponding to a storage wallet that is distinct from an asset wallet storing the existing token;
detect transfer of the existing token from the asset wallet to the storage wallet based at least in part on the storage wallet address; and
determine that the entity controls the private key required to transfer the existing token to a different location on the distributed storage system based at least in part on detecting transfer of the existing token from an asset wallet to the storage wallet address.

24. The at least one non-transitory computer-readable medium of claim 19, wherein the proxy token is generated by:
generating a minting transaction for the proxy token;
signing the minting transaction using a private key of the initializer wallet associated with the entity; and
executing the minting transaction to generate the proxy token.

* * * * *